(12) United States Patent
Vratimos et al.

(10) Patent No.: US 10,754,999 B1
(45) Date of Patent: Aug. 25, 2020

(54) GENERATING A PHOTOVOLTAIC SYSTEM DESIGN FOR A BUILDING

(71) Applicant: Sunpower Corporation, San Jose, CA (US)

(72) Inventors: Miltiadis Vratimos, Berkeley, CA (US); Jacob Wachman, San Francisco, CA (US); Grzegorz Biziel, Wroclaw (PL); Derrick Boudwin, San Jose, CA (US); Blaz Snuderl, Maribor (SI); Dominik Kulikowski, Wlen (PL); James Mannix, Richmond, CA (US); Nour Daouk, San Francisco, CA (US); Austen A. Satterlee, San Francisco, CA (US)

(73) Assignee: SUNPOWER CORPORATION, San Jose, CA (US)

(*) Notice: Subject to any disclaimer, the term of this patent is extended or adjusted under 35 U.S.C. 154(b) by 0 days.

(21) Appl. No.: 16/685,670

(22) Filed: Nov. 15, 2019

Related U.S. Application Data

(60) Provisional application No. 62/830,013, filed on Apr. 5, 2019.

(51) Int. Cl.
*G06F 30/00* (2020.01)
*G06F 3/0484* (2013.01)
*G06F 30/13* (2020.01)
*G06N 3/08* (2006.01)
*G06T 7/70* (2017.01)
*G06T 11/20* (2006.01)
*H02S 20/24* (2014.01)
*G06T 7/13* (2017.01)
(Continued)

(52) U.S. Cl.
CPC .......... *G06F 30/13* (2020.01); *G06F 3/04845* (2013.01); *G06F 30/00* (2020.01); *G06N 3/08* (2013.01); *G06T 7/13* (2017.01); *G06T 7/70* (2017.01); *G06T 11/20* (2013.01); *H02S 20/24* (2014.12); *G06F 2111/04* (2020.01); *G06T 2200/24* (2013.01); *G06T 2207/10032* (2013.01); *H01L 31/02021* (2013.01); *Y02B 10/12* (2013.01)

(58) Field of Classification Search
None
See application file for complete search history.

(56) References Cited

U.S. PATENT DOCUMENTS

| | | | |
|---|---|---|---|
| 8,818,924 B2* | 8/2014 | Wayne | G06F 30/13 706/45 |
| 8,826,163 B1* | 9/2014 | Chanin | H02S 99/00 715/764 |
| 9,934,334 B2* | 4/2018 | Pryor | G06Q 10/04 |

(Continued)

*Primary Examiner* — Kibrom K Gebresilassie
(74) *Attorney, Agent, or Firm* — Xsensus LLP

(57) ABSTRACT

A solar design generation system is configured to design a solar panel or photovoltaic (PV) system for the roof of building. A server includes processing circuitry configured to receive information from a remote device, including an address corresponding to a building having a roof, automatically generate a solar design in real time based on the received information, and display the solar design to a user. The user can interact with the solar design in various ways to accommodate, implement and calculate various design changes, design rules and electricity generation (production) estimates.

18 Claims, 20 Drawing Sheets

(51) Int. Cl.
*H01L 31/02* (2006.01)
*G06F 111/04* (2020.01)

(56) References Cited

U.S. PATENT DOCUMENTS

| | | | |
|---|---|---|---|
| 10,256,767 B1* | 4/2019 | Sinai | H02S 30/10 |
| 10,373,011 B2 | 8/2019 | Ananthakrishnan et al. | |
| 2008/0105045 A1* | 5/2008 | Woro | G06F 30/20 |
| | | | 73/170.27 |
| 2009/0125275 A1* | 5/2009 | Woro | G06F 30/13 |
| | | | 702/182 |
| 2009/0177458 A1* | 7/2009 | Hochart | G06T 17/05 |
| | | | 703/18 |
| 2010/0217565 A1 | 8/2010 | Wayne et al. | |
| 2010/0217566 A1 | 8/2010 | Wayne et al. | |
| 2010/0217639 A1* | 8/2010 | Wayne | G06F 30/13 |
| | | | 705/7.23 |
| 2010/0217724 A1* | 8/2010 | Wayne | G06Q 50/165 |
| | | | 705/348 |
| 2011/0205245 A1* | 8/2011 | Kennedy | G06Q 10/10 |
| | | | 345/636 |
| 2012/0035887 A1* | 2/2012 | Augenbraun | G06T 15/06 |
| | | | 703/1 |
| 2012/0121125 A1* | 5/2012 | Dimov | G01W 1/12 |
| | | | 382/103 |
| 2013/0061198 A1* | 3/2013 | Brier | G06F 3/0481 |
| | | | 716/139 |
| 2013/0067836 A1* | 3/2013 | Sherman | H02S 40/36 |
| | | | 52/173.3 |
| 2013/0132043 A1 | 5/2013 | Wayne et al. | |
| 2013/0246010 A1* | 9/2013 | Dershowitz | G06F 30/00 |
| | | | 703/1 |
| 2014/0032178 A1* | 1/2014 | Kicinski | G06F 30/13 |
| | | | 703/1 |
| 2015/0039460 A1* | 2/2015 | Parekh | G06F 3/04845 |
| | | | 705/26.3 |
| 2015/0066442 A1* | 3/2015 | Pryor | G06Q 50/06 |
| | | | 703/1 |
| 2015/0199104 A1* | 7/2015 | Gontowski | G06Q 50/06 |
| | | | 715/771 |
| 2016/0004795 A1* | 1/2016 | Novak | G06F 30/20 |
| | | | 703/1 |
| 2016/0292312 A1* | 10/2016 | Saha | G06Q 40/00 |
| 2017/0091578 A1* | 3/2017 | Ananthakrishnan | |
| | | | G01C 21/3617 |
| 2017/0178043 A1 | 6/2017 | Wayne et al. | |
| 2018/0089339 A1* | 3/2018 | Udell | H02S 20/23 |
| 2018/0239841 A1* | 8/2018 | Wachman | G06F 30/13 |
| 2018/0293335 A1 | 10/2018 | Wayne et al. | |

\* cited by examiner

Fig. 14C

GENERATING A PHOTOVOLTAIC SYSTEM DESIGN FOR A BUILDING

CROSS-REFERENCE TO RELATED APPLICATION

This application claims the benefit of U.S. Provisional Application No. 62/830,013, filed Apr. 5, 2019, which is incorporated herein by reference in its entirety.

BACKGROUND

Conventionally, a solar panel system design is created with significant manual input, even when conventional design software is used, to accommodate regulatory restrictions, obstructions and production estimates. These complications are magnified with larger designs, such as commercial-scale solar panel systems intended for commercial buildings.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, a solar design generation system is configured to design a solar panel or photovoltaic (PV) system for the roof of building. A server includes processing circuitry configured to receive information from a remote device, including an address corresponding to a building having a roof, automatically generate a solar design in real time based on the received information, and display the solar design to a user. The user can then interact with the solar design in various ways to accommodate, implement and calculate various design changes, design rules and electricity generation (production) estimates.

The foregoing paragraph has been provided by way of general introduction and is not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 14A-14C illustrate an exemplary user interface according to one or more aspects of the disclosed subject matter.

DETAILED DESCRIPTION

Figure 1:
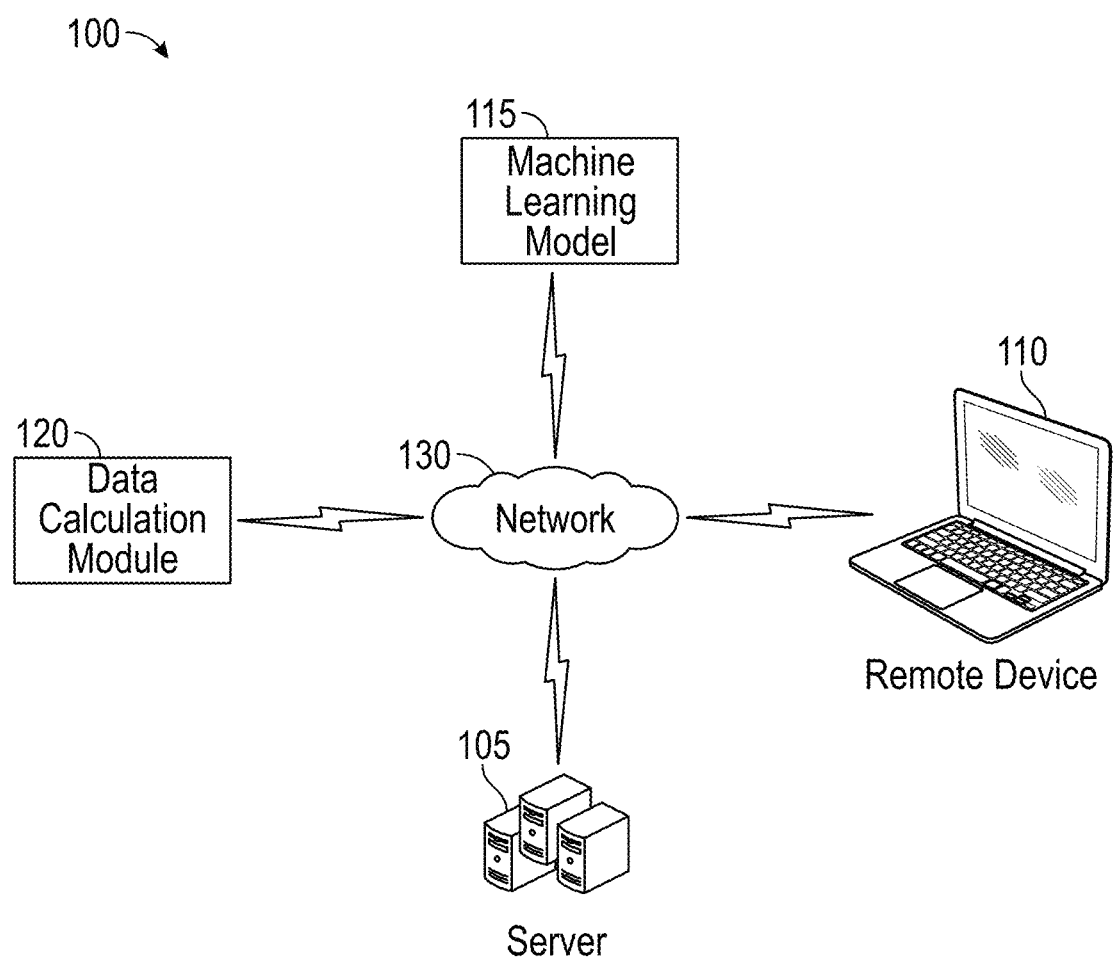
FIG. 1 illustrates an exemplary system for photovoltaic (PV) system design according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Traditionally, anyone wanting to install a system of solar panels (a photovoltaic array, a solar panel system, etc.) on a roof has limited resources to determine important information required for an accurate installation strategy and design. For example, it is impractical for the property owner to know specific details about their roof including location of roof parapet walls, orientation, and tilt, for example. Additionally, property owners may not be familiar with where each obstruction on the roof is located, legally mandated setbacks, requirements pertaining to global and national electrical and fire codes, and the like, which can be referred to as design rules. Often the process becomes too overwhelming and potential customers abandon their efforts of installing any solar panels despite their good intentions of transitioning to renewable energy. That is why solar panel system designs are typically done by dealers who are experienced with solar panel system designs and installation. However, the design process is still difficult even for dealers. For example, those who do make it over the initial hurdles and make it to a design portion of the process of designing a solar panel system for their property face additional challenges. Traditionally, it is challenging to design a solar panel system for any building, and in particular for a roof of a building, because it requires a significant amount of manual work whether the design is utilizing design software or not, and whether the building is a relatively small home or a very large factory building. Additionally, the design process can be slow because of computational power required to generate and display the design and include any power generation statistics for the solar panel system that the property owner would be interested in (e.g., cost savings based on their specific roof).

Referring now to the drawings, wherein like reference numerals designate identical or corresponding parts throughout the several views:

FIG. 1 illustrates an exemplary system 100 for photovoltaic (PV) system design (herein referred to as the system 100) according to one or more aspects of the disclosed subject matter. The system 100 can include a server 105, a remote device 110, a machine learning model 115, a data calculation module 120, and a network 130.

The server 105 can represent one or more servers communicably coupled to the remote device 110, the machine learning model 115, and the data calculation module 120 via the network 130. The server 105 can be configured to perform various processing for the system 100 as further described herein. Additionally, the server 105 can represent a dedicated bank of servers, cloud-based processing, and/or a serverless computing system corresponding to a virtualized set of hardware resources.

The remote device 110 can represent one or more remote devices communicably coupled to the server 105, the machine learning model 115, and the data calculation module 120 via the network 130. The remote device 110 can be a computer, laptop, smartphone, tablet, PDA, and the like. The remote device 110 can be operated by a user to interact with the system 100 as further described herein. For example, a salesperson, a dealer, a client, or a current and/or future customer can use remote device 110 to connect to the system 100 to generate a PV system design as further described herein.

The machine learning model 115 can represent one or more machine learning models communicably coupled to the server 105, the remote device 110, and the data calculation module 120 via the network 130. The machine learning model 115 can be a trained model used in the system 100 to calculate various information for generating the PV system design as further described herein.

The data calculation module 120 can represent one or more data calculation modules communicably coupled to the server 105, the remote device 110, and the machine learning model 115 via the network 130. The data calculation module 120 can be configured to receive various requests from the system 100 to perform various calculations and gather data as further described herein. For example, the data calculation module 120 can provide portions of the location information relevant for the PV system design.

The network 130 can be a public network, such as the Internet, or a private network, such as an LAN or WAN network, or any combination thereof and can also include PSTN or ISDN sub-networks. The network 130 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known.

Generally, the system 100 can design a photovoltaic (PV) system for a roof identified based on a received location. For example, the system 100 can receive a location (e.g., property address, commercial building address, industrial building address, residential address, etc.). Additionally, for example, in commercial and industrial PV system designs, the system can also receive, from a user, a user-selected area for the design, a PV system type, a PV panel or module type, and setback and walkway rules to generate a PV system design based on the user input. The system 100 can then display the generated PV system design. The displayed design can include PV panel placement, solar access of the PV system, energy production information of the PV system, and the like. In other words, from a user's perspective, the user can enter information at the remote device 110 (e.g., the user's laptop), and the backend of the system 100 can generate a PV system design based on the user input. Then, the system 100 can display the PV system design (e.g., a frontend design) to the user. It should be appreciated that PV system design and solar design can be used interchangeably herein to refer to a design for a system of PV panels placed on a roof.

More specifically, in one aspect, the system 100 can generate a solar design for the roof of a commercial or industrial building. For example, the system 100 can determine location related information relevant for the roof of a commercial or industrial building based on the received property address (e.g., address of the commercial building). Additionally, the system 100 can determine a topology of the roof (e.g., by reconstructing the roof in 3D), and a panel layout can be determined using identified roof topology. Further, the panel layout can be used to calculate power generation of the PV system and both the PV system and the power generation information can be used in the frontend design. The location information and layout can also be used to determine the solar access of the roof After determining the solar access information, the total solar resource fraction (TSRF) can be calculated based on the solar access information and a tilt orientation factor (TOF) of the roof (e.g., the TOF can be calculated based on the roof topology information and heliopath information from the solar access determination). Finally, the frontend design (i.e., the PV system design, which can include the specific panel placement, TSRF, and solar access) can be generated based on the PV panel layout, the power generation information, the solar access information, and the TSRF information. In other words, the PV system design can correspond to the specific panel placement, tilt and azimuth of each panel, and the like, while also referring to the displayed design which can include the specific placement of the panels, the TSRF information, power generation information, solar access information, etc.

In other words, the system 100 can "automatically" generate a solar design in real time based on the received user input. "Automatically" is used herein to emphasize features of this disclosure, where conventional computer-implemented tasks that previously relied on substantial user input, direction and manipulation (collectively, "user decisions"), by virtue of the teachings of this disclosure, can be decided and implemented by processing circuitry. Consequently, a commercial-scale solar design can be generated in less than one minute, whereas a comparable conventional solar design may take days or weeks. This significant improvement in speed and efficiency allows multiple designs to be generated in a single day. Because the solar designs can be generated so quickly, updates and modifications to the designs can be made at any time during the design process without derailing the design process. For example, the user can decide they want to try a different type of PV panel, update the type of PV panel via a user interface, and receive an updated commercial solar design in less than a minute. Additionally, setbacks or other design rules can be modified in real time to accommodate customer or regulatory requirements. Accordingly, generating commercial solar designs using the system 100 can significantly increase speed and efficiency by automatically generating commercial solar designs based on the received user input.

Figure 2:
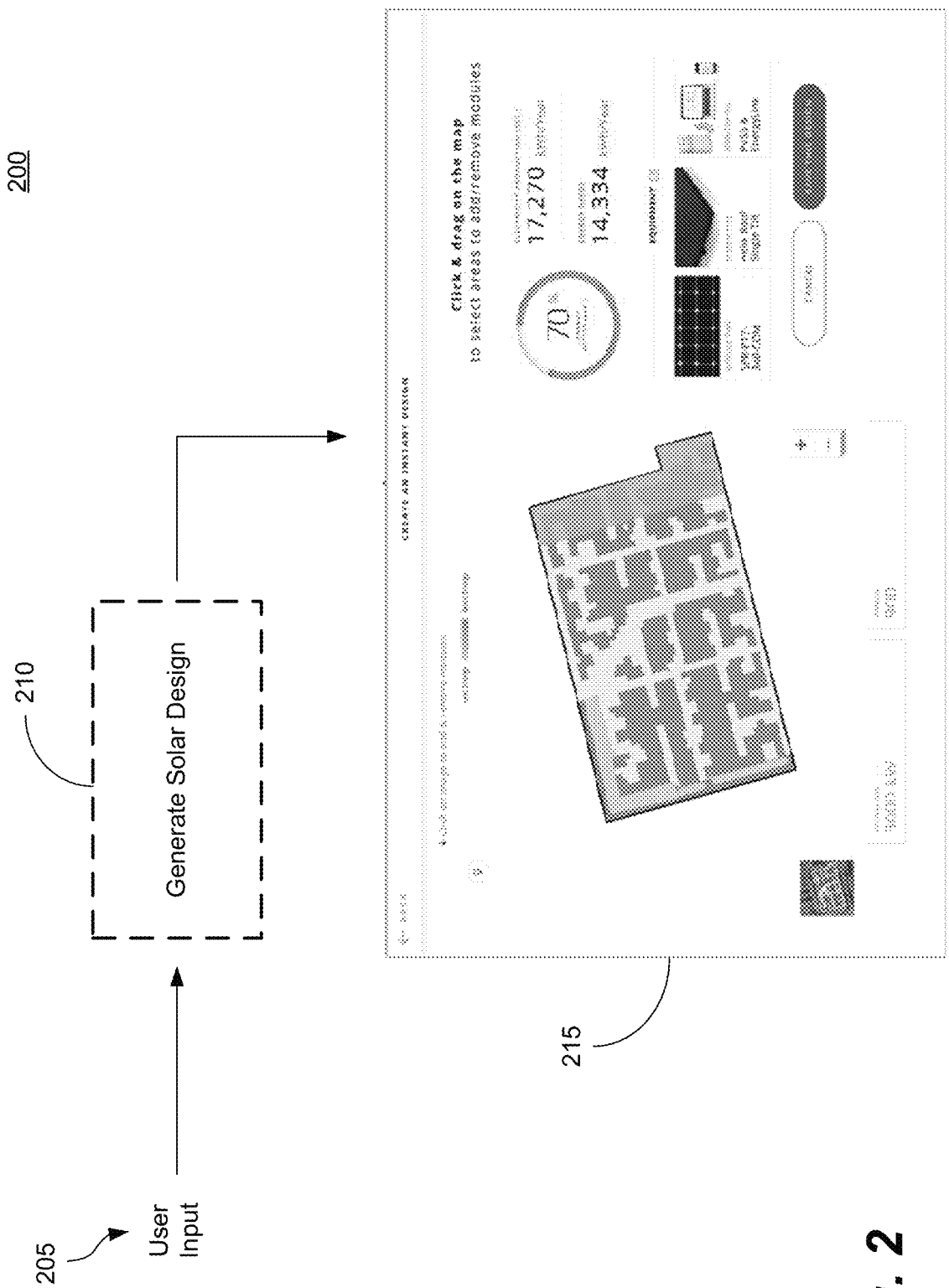
FIG. 2 illustrates an exemplary PV system design workflow according to one or more aspects of the disclosed subject matter.

FIG. 2 illustrates an exemplary PV system design workflow 200 according to one or more aspects of the disclosed subject matter. The workflow 200 can correspond to a user's perspective. For example, the workflow 200 can include user input 205. The user input 205 can include receiving location information of a building (e.g., a commercial building address), specifying an area for which the design will be created, specifying system type and module type, and specifying setback and walkway rules. The user input 205 can be input via a user device (e.g., the remote device 110) to a server (e.g., the server 105) for solar design generation 210 (e.g., backend PV system design) which is further described herein. The solar design generation 210 can then output a solar design 215. The solar design 215 can correspond to the frontend PV system design which can include a visual representation of the roof including an optimized number and placement of PV panels, power generation information based on the number and placement of the PV panels, solar access and TSRF information, and the like. Additionally, in one aspect, the solar design 215 can include a three-dimensional representation of the roof with the solar design (see FIG. 15).

Figure 3A:
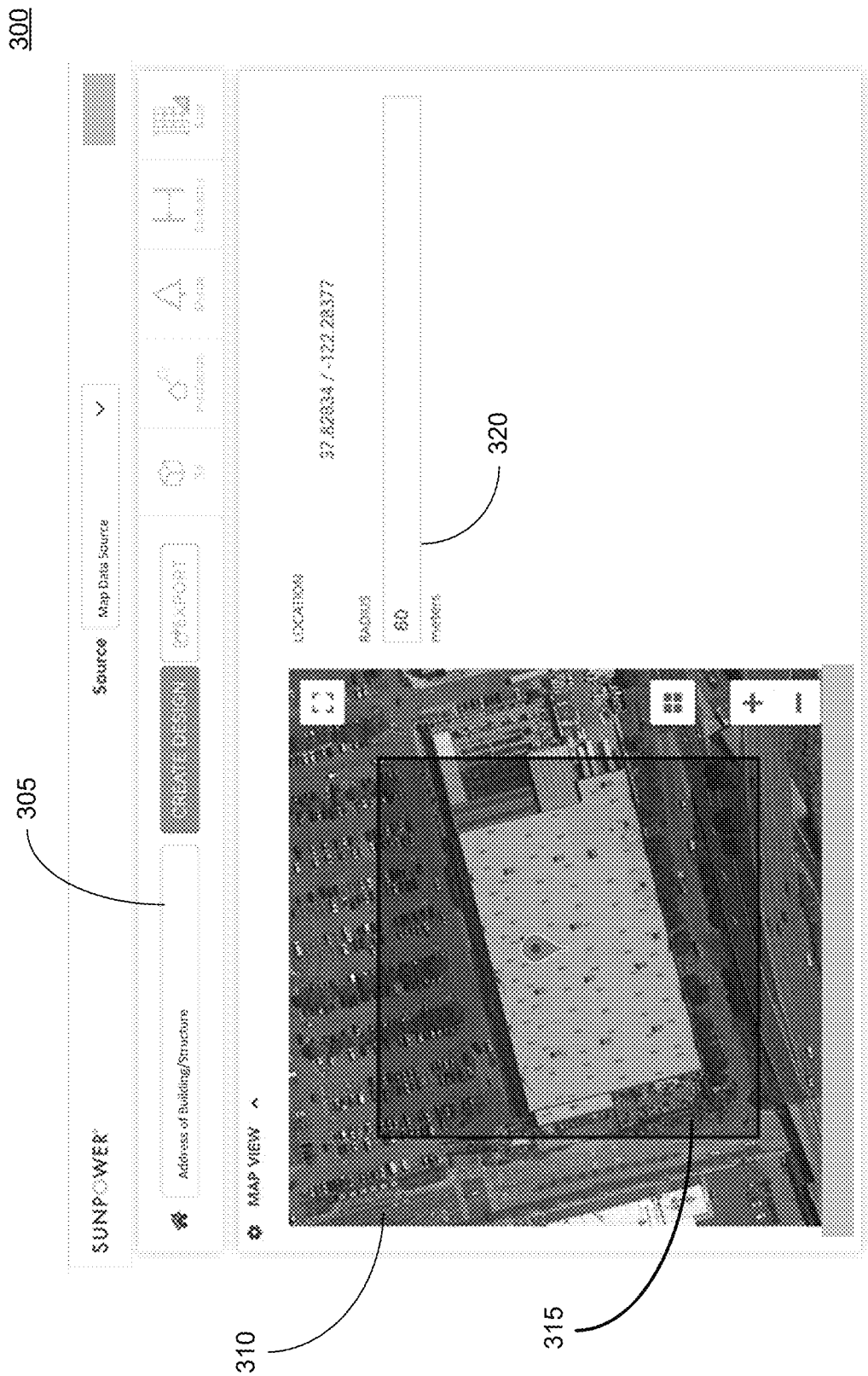
FIG. 3A illustrates an exemplary portion of a user interface according to one or more aspects of the disclosed subject matter.

FIGS. 3A-3D illustrate various user interfaces where a user can enter the user input 205. For example, the remote device 110 can be configured to display the user interface and receive the corresponding user input. FIG. 3A illustrates a portion of a user interface 300 according to one or more aspects of the disclosed subject matter. The user interface 300 can be configured to receive the location of the building (e.g., commercial address) at a location input section 305. Based on the location entered in the location input section 305, the user interface 300 can be configured to display a map view 310. Although other types of locations can be contemplated, in one aspect, the location entered can be a commercial address corresponding to a commercial and/or industrial building. The map view 310 can be an overhead view or an orthogonal view (e.g., using a satellite image) of the roof corresponding to the commercial address. Further, the user interface 300 can be configured to receive user input corresponding to using a selection box 315 and specifying a dimension (e.g., a radius 320) of the selection box 315 so that the selection box encloses a roof area that the user wants to generate a solar design for. In one aspect, the user can select the entire roof. Alternatively, the user can select a portion of the roof. In either case, the user can move the selection box 315 around and adjust one or more dimensions of the selection box 315 to select the portion of the roof to generate a solar design for.

Figure 3B:
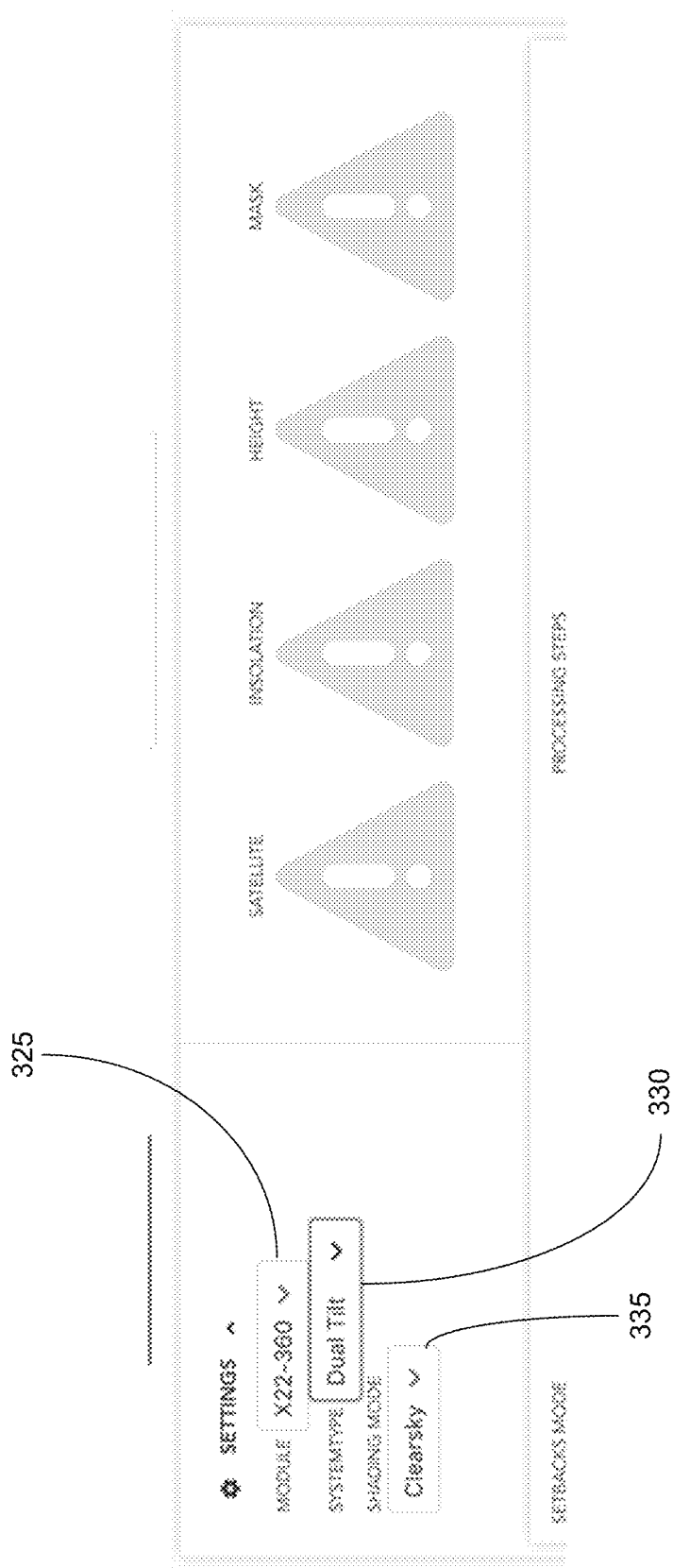
FIG. 3B illustrates a portion of the user interface according to one or more aspects of the disclosed subject matter.

FIG. 3B illustrates a portion of the user interface 300 according to one or more aspects of the disclosed subject matter. The user interface 300 can be configured to receive a module type selection at a module selection section 325. In other words, the user can specify which module type they want to use for their solar design. Additionally, the user interface 300 can be configured to receive system type selection at a system type selection section 320. In other words, the user can specify which system type (e.g., single tilt or dual tilt) they want to use for their solar design. The user interface 300 can also be configured to receive a shading mode selection at a shading mode selection section 335 so the user can specify which shading mode they want to use for their solar design.

Figure 3C:
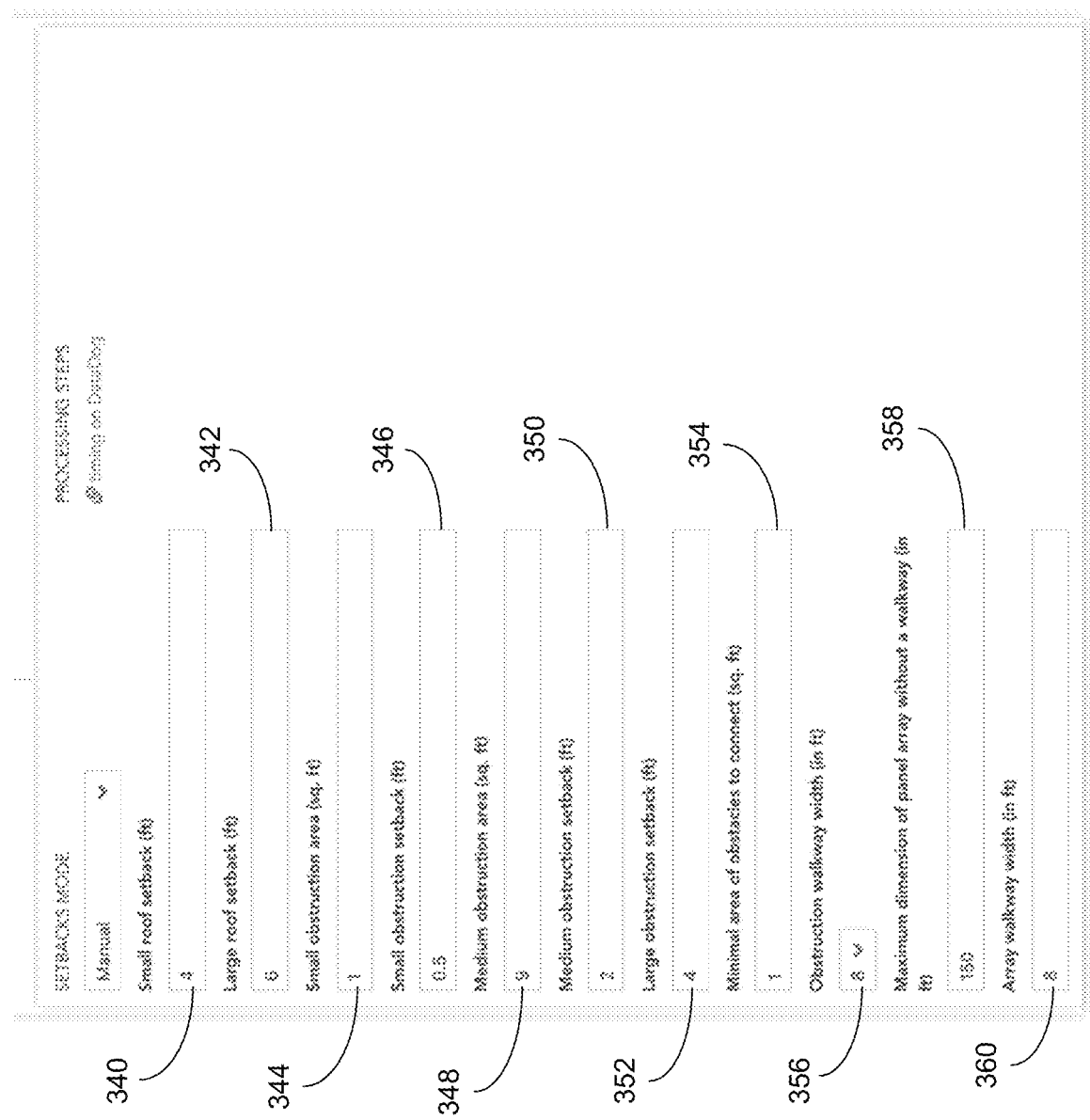
FIG. 3C illustrates a portion of the user interface according to one or more aspects of the disclosed subject matter.

FIG. 3C illustrates a portion of the user interface 300 according to one or more aspects of the disclosed subject matter. The user interface 300 can be configured to receive set back and walkway rules for the solar design. For example, the user can specify a small roof setback 340 and a large roof setback 342. The user can also specify the setback for different obstruction sizes. An obstruction can include various objects on a roof where a PV panel cannot be placed (e.g., HVAC units, skylights, pipes, etc.). For example, the user can specify a small obstruction area 344 and a medium obstruction area 348. Additionally, the user can also specify a corresponding small obstruction set back 346, a medium obstruction setback 350, and a large obstruction setback 352. In other words, an obstruction is small if it has an area less than the area indicated in the small obstruction area 344. Accordingly, if an obstruction is small (e.g., less than 1 sq. ft. as illustrated for small obstruction area 344) then that obstruction will have a designated setback based on the small obstruction setback 346. Similarly, a medium obstruction will have an area that is less than the medium obstruction area 348 (and equal to or larger than the small obstruction area) and a corresponding medium obstruction setback 350, and a large obstruction will have an area equal to or larger than the medium obstruction area 348 and a corresponding large obstruction set back 352.

Additionally, the user interface 300 can be configured to receive input for a minimal area of obstacles to connect 354 which specifies which obstructions will get walkway access as part of the solar design. For example, if an obstruction has an area larger than the designated area, that obstruction gets walkway access. However, if an obstruction has an area that is equal to or smaller than the specified area, then the obstruction will not get a walkway. Further, the user can specify the obstruction walkway width 356 which can correspond to a size of the walkways used for the obstructions. The user interface 300 can also be configured to receive input corresponding to a maximum dimension of panel array without a walkway 358 which can correspond to the largest possible PV array placed on the roof before a walkway is inserted. Additionally, an input for array walkway width 360 can correspond to an area of the walkway that is placed between PV arrays.

Figure 3D:
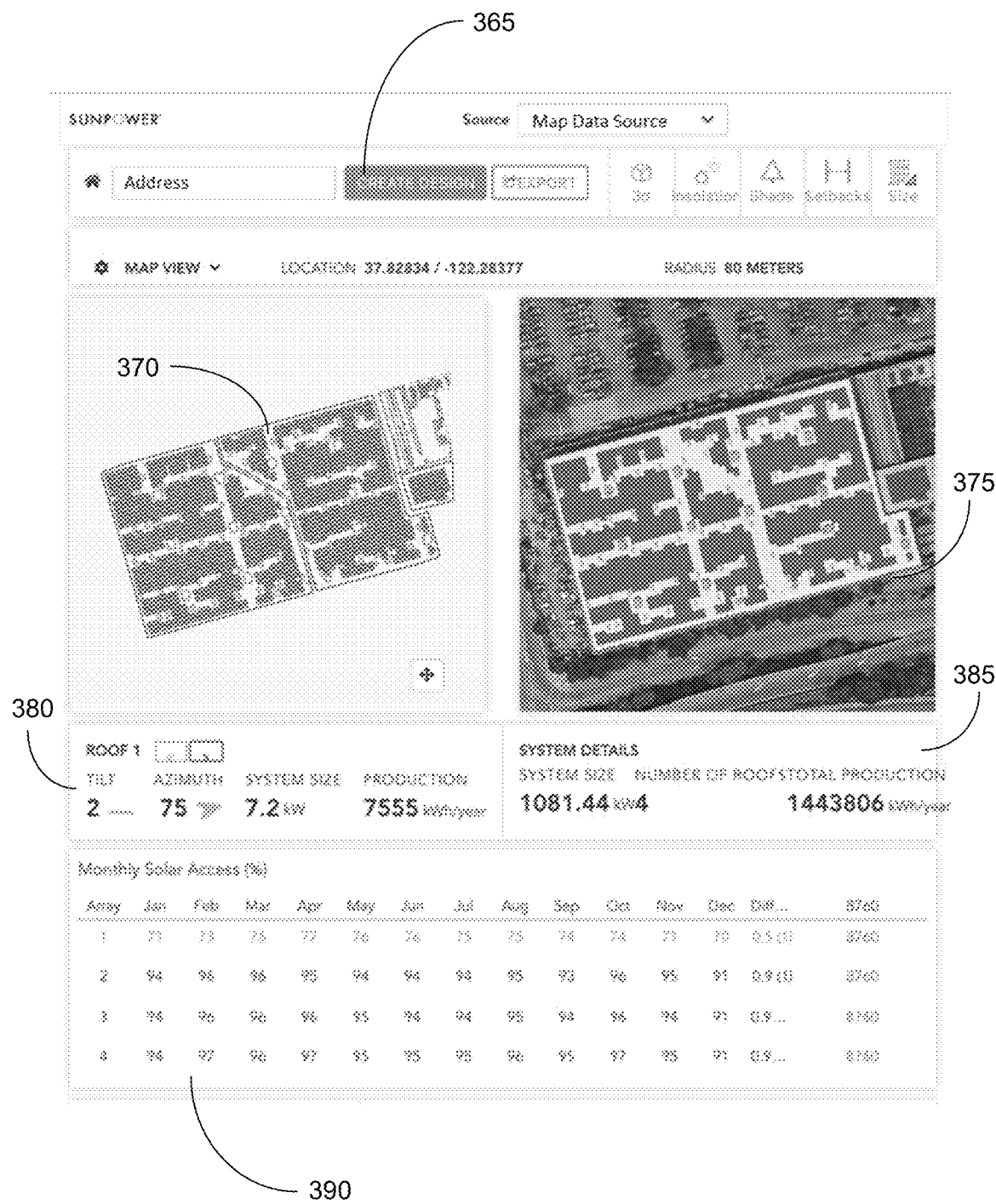
FIG. 3D illustrates the user interface after generating the solar design according to one or more aspects of the disclosed subject matter.

FIG. 3D illustrates the user interface 300 after generating the solar design according to one or more aspects of the disclosed subject matter. For example, after entering the user input (e.g., user input 205) as shown in FIGS. 3A, 3B, and 3D, the user can select the create design button 365 to generate the solar design (e.g., generate solar design 210 for backend solar design generation). After selecting the create design button 365 and waiting for the solar design to be generated on the backend, the user interface 300 can be configured to display the solar design. The user interface 300 for displaying the solar design can include a first view 370 corresponding to an outline of the structure and solar panel system and a second view 375 corresponding to an orthogonal or overhead view with the PV panel placement corresponding to the solar design overlaid on the roof. Additionally, the user interface 300 can display a tilt, azimuth, system size, and energy production information included in a segmentation information section 380. The user interface 300 can also include a system information section 385 including a system size, number of roofs, total production, and the like. The user interface 300 can also display solar access information 390 where the solar access information 390 can be displayed as a percentage corresponding to the solar access of the solar design per month, for example. Additionally, the solar access percentage can be based on another time frame (e.g., day, year, etc.).

Figure 4:
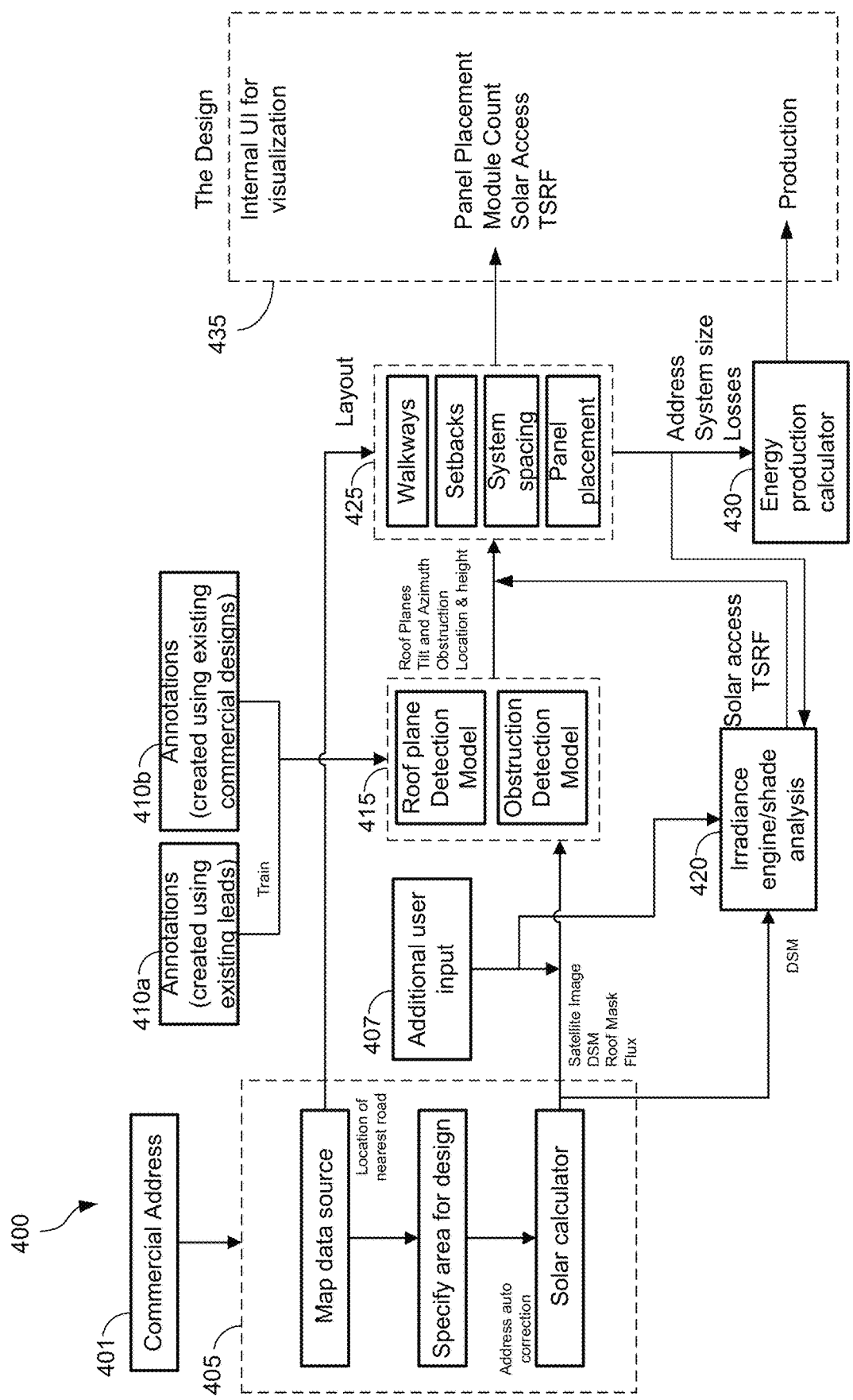
FIG. 4 illustrates an exemplary workflow of the solar design generation according to one or more aspects of the disclosed subject matter.

FIG. 4 illustrates an exemplary workflow 400 of the solar design generation 210 according to one or more aspects of the disclosed subject matter. A location of a building (e.g., the commercial address 401) can be input into the workflow 400, and location information 405 can be determined based on the address.

A roof topology 415 can be determined using the location information 405, annotations 410a and 410b which are used to train machine learning models, and additional user input 407. The additional user input 407 can include some or all of the user input described in FIGS. 3A-3C. Additionally, the trained machine learning models (e.g., machine learning models 115) can be a roof plane detection model (e.g., segmentation of the roof to identified eaves, saddles, valleys, ridges, hips, etc.) and an obstruction detection model (e.g., identification of obstructions on the roof preventing panel placement). The trained machine learning models can be used to determine the roof topology 415. In other words, the machine learning models can be used to predict the roof topology (e.g., roof planes and obstructions) based on the training by using satellite imagery corresponding to the address and a digital surface map (DSM) corresponding to the address, for example.

Regarding training the machine learning models using the annotations 410a and 410b, the annotations 410a and 410b can be created manually. For example, software (e.g., an annotation generation software application) can be used to open the existing designs (e.g., commercial designs generated from leads and/or existing completed commercial solar designs). Opening the existing designs with the software can import the imagery into the annotation generation software application. Then, using existing designs as a guide, polygons can be created for each roof and roof element. This can correspond to manually drawing polygons around the roof and any obstacles on the roof. The roof outline can include outlining the outer portion of the roof and tracing the inner portion of the roof. Next, each polygon can be categorized. The categories can include roof plane, obstruction, tree, shadow, open structure, and the like. The annotated files for roof and roof elements can be saved and used to create an input data batch that can be used to train the machine learning algorithms.

Further, regarding training the machine learning algorithms, a process can be performed to run predictions. At an annotations state, annotation data for the roofs can be loaded together with satellite input data. Next, the data can be split into tiles. More specifically, the data is broken into smaller portions with the goal being to achieve optimal balance between a single input tile size and a size of a training batch. Next, the process can apply augmentation. For example, each time a tile is requested, randomly apply some transformation to the image, i.e. rotate, flip, translate. This is to artificially enlarge the training set by altering it. Next, the data can be normalized. For example, each part of the satellite input data (RGB, DSM) is normalized to uniform space. The goal is to reduce the noise in early stages of training. Next, the tiles can be shuffled randomly. For example, the tiles are buffered and shuffled. The goal is to mix tiles from different roofs to avoid training steps skewed too much towards only narrow set of features. Next, an input data batch can be created where several tiles are collected into a batch. The batch size should be a trade-off between tile size and available memory. Next, the process can include running a prediction. The training process can be performed as a series of predictions over training sets with known desired output. A delta between output and annotations is used to update the model. For example, based on each iteration of training, an incremental update for the model can be generated. The update can be applied to the model and the statistics are stored to control the process. Additionally, the process can include an obstruction/roof segmentation neural network (NN) model. For example, a segmentation neural network can be created with a goal of prediction obstructions on the roof or the segmentation of the roof itself. This obstruction/roof segmentation neural network model can receive information from the model update and neural network models parameters and the output can be used to run predictions with the input data batch. The neural network model's parameters can include a set of hyper-parameters that are human-tunable, i.e. size/depth of some parts of the network, planned training process, special weights for the loss function. These can be adjusted manually in the course of testing process.

Additionally, the location information 405 and the additional user input 407 can be used in an irradiance engine/shade analysis 420 to determine solar access and TSFR as further described herein.

A layout 425 including identifying setbacks, walkways, system spacing, and PV panel placement can be determined based on the location information 405 and the roof topology 415. The layout 425 can also be input to a power generation calculation software 430 (e.g., an energy production calculator such as PV API and/or PV Watts). After determining the layout 425, the solar design 435 can be generated, and the solar design 435 can include panel placement, module count, solar access, TSRF, and total energy production, for example.

It should be appreciated that various tools can be used to provide third party data to the workflow 400. For example, a tool that generates a map view can be used as a map data source (e.g., Google Maps). Additionally, a solar calculator can be used to map a roof's solar savings potential, calculate shadows from nearby structures and trees, and/or account for weather and temperature patterns (e.g., Sunroof). Further, an energy production calculator can be used to estimate the energy production and cost of energy of grid-connected photovoltaic energy systems (e.g., PV Watts and/or PV API). In other words, various third-party software can be configured to receive input and calculate various information that can be used in the solar design process (e.g., requests to the data calculation modules 120). However, the third-party software illustrated in FIG. 4 is exemplary and can be replaced with other third-party and/or proprietary software.

Figure 5:
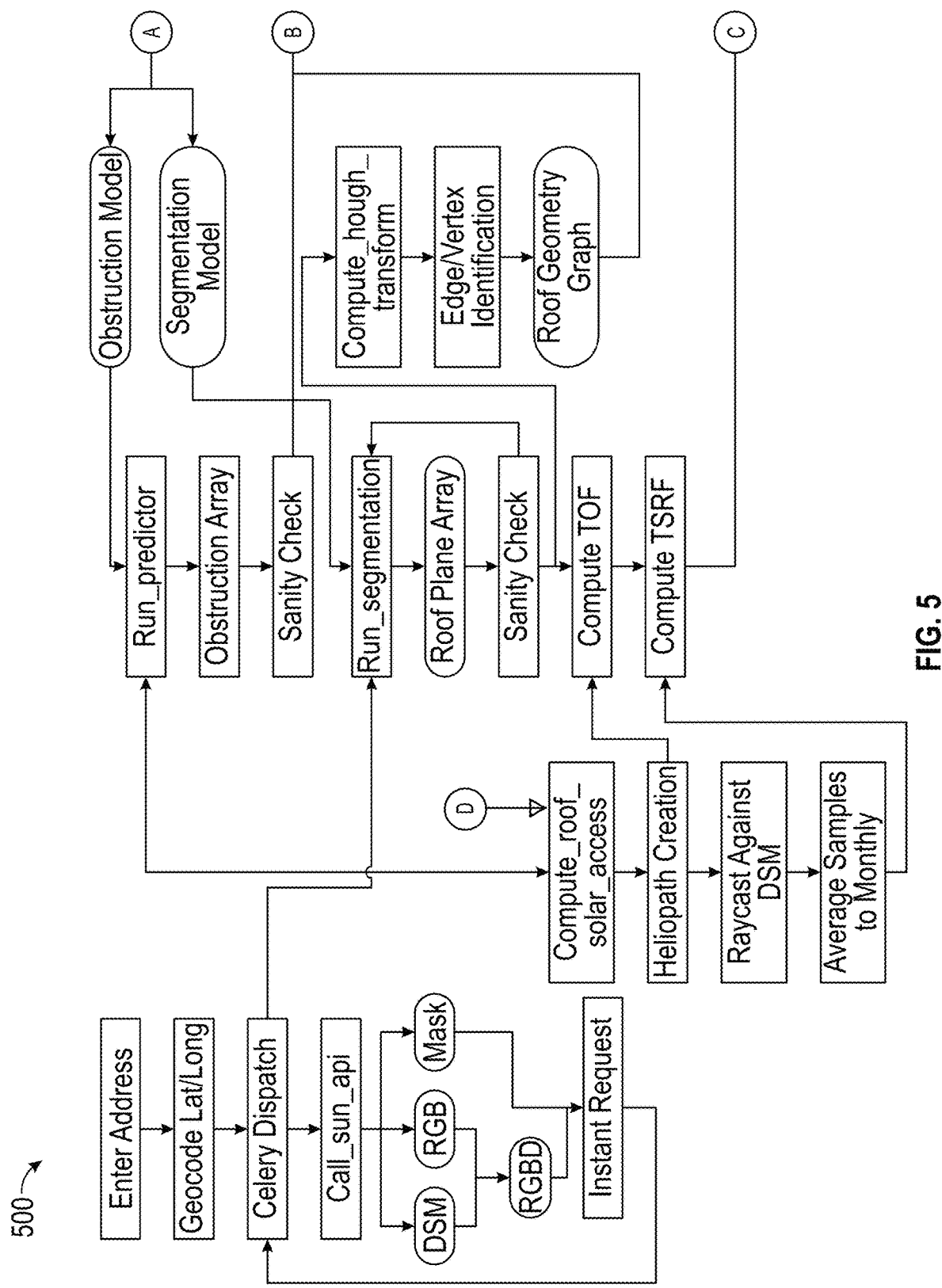
FIG. 5 illustrates an exemplary architecture of the solar design generation according to one or more aspects of the disclosed subject matter.
Figure 5:
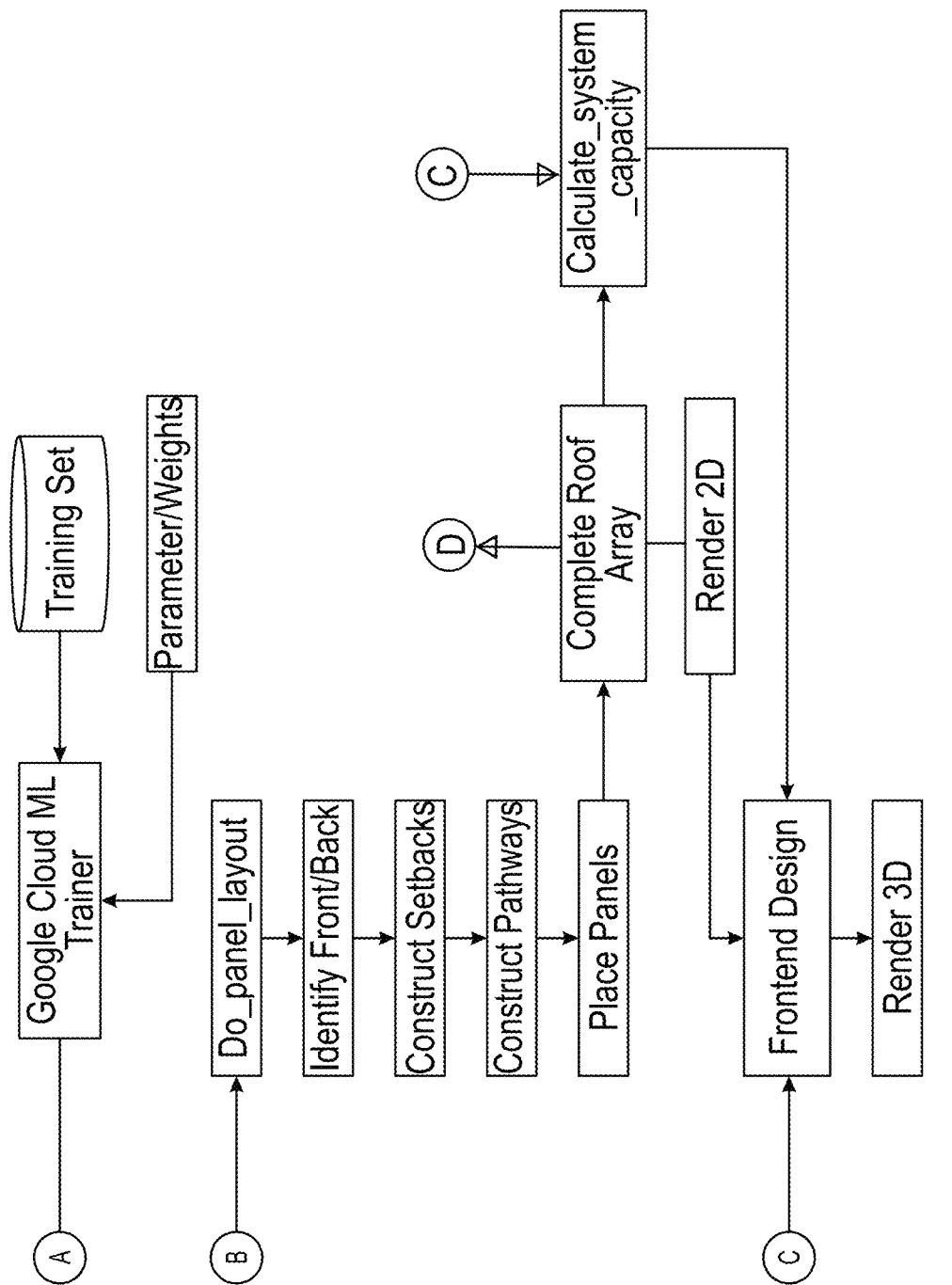

FIG. 5 illustrates an exemplary architecture 500 of the solar design generation 210 according to one or more aspects of the disclosed subject matter. The architecture 500 can be configured to generate a solar design for the roof of the building. The architecture 500 can also be designed to handle the large amounts of data and processing required to generate a complex or large-scale (e.g. commercial) solar design. Because of the size of the roofs for commercial buildings, the significant amount of information needs to be identified and processed quickly to efficiently generate a commercial solar design. Additionally, any two or more of the steps and/or processes in the architecture 500 can be performed in parallel or in a different order, and the order of the following description of the architecture is simply for explanation purposes.

The architecture 500 can determine location related information relevant for the roof of the building based on the received location (e.g., commercial address). The location related information, while including a geocode latitude and longitude corresponding to the user-selected area (e.g., commercial address), can also include information related to the shape of the roof and any other objects near and/or overlapping with the roof. For example, a digital surface model (DSM) can be requested based the received address, and the DSM can be a 3D point cloud representing the residence corresponding to the address to begin identifying shapes of the roof and any other structures near and/or obscuring any portion of the roof. In other words, a request can be sent through an API and a satellite of the address and its surroundings can be received in response to the request. Additionally, the information received in response to the request can include a DSM (or height map) and a mask. The satellite imagery can be an aerial view of the roof and the surroundings, and the image can be a red, green, blue (RGB) image centered on the roof corresponding to the address. The DSM is a point cloud (e.g., a collection of points) that determine the height of the roof and the roof's features. Each point in the point cloud has an x, y, and z element. The mask can correspond to a grid of ones and zeros which can be overlaid on both the DSM and the satellite image. In other words, any pixel of the image identified as a roof is a one, which remains visible in the image, and any portion of the image that is not a roof is labeled as zero and gets masked out. In this way, the roof of the address can be identified.

Additionally, the architecture 500 can determine a topology of the roof, and a panel layout can be determined using the identified roof topology. The roof topology can include identifying obstructions on the roof and identifying segments of the roof. For identifying segments of the roof, the architecture 500 can use a segmentation model trained using machine learning. For example, the machine learning algorithm can be fed a training set of annotated roofs (e.g. annotations 410*a*, 410*b*) with all the roof planes being labeled. Then the different types of roof edges (e.g., eaves, valleys, ridges, hips, etc.) can be deduced in post processing. The labeling can be done by hand for known roofs to create an accurate training set, for example. The machine learning algorithm can also be fed different sets of obstructions to determine what is a roof edge compared to a roof pipe, an HVAC unit, a skylight, and the like, for example. The machine learning algorithm can then output a segmentation model that can be used to identify segments of the roof that corresponds to the location (e.g., commercial address) input by the user. Similarly, the architecture 500 can use an obstruction model trained using machine learning. For example, the machine learning algorithm can be fed a training set of annotated roofs (e.g. annotations 410*a*, 410*b*) with all the obstructions of the roof being labeled. The labeling can be done by hand for known roofs to create an accurate training set, for example. The machine learning algorithm can then output an obstruction model that can be used to identify obstructions on the roof that correspond to the building address input by the user.

The architecture 500 can determine the panel layout using the roof topology information. For example, the architecture 500 can identify construct setbacks, construct pathways/walkways, place PV panels accordingly, and output the panel layout for the solar design. Further, the panel layout can be used to calculate power generation of the PV system and both the PV system and the power generation information can be used in the frontend design.

Additionally, the architecture 500 can also use the location information and panel placement to determine the solar access of the roof. After determining the solar access information, the total solar resource fraction (TSRF) can be calculated based on the solar access information and a tilt orientation factor (TOF) of the roof (e.g., the TOF can be calculated based on the roof topology information and heliopath information from the solar access determination). Finally, the frontend design (i.e., the PV system design) can be generated based on the PV panel layout, the power generation information, the solar access information, and the TSRF information.

Figure 6:
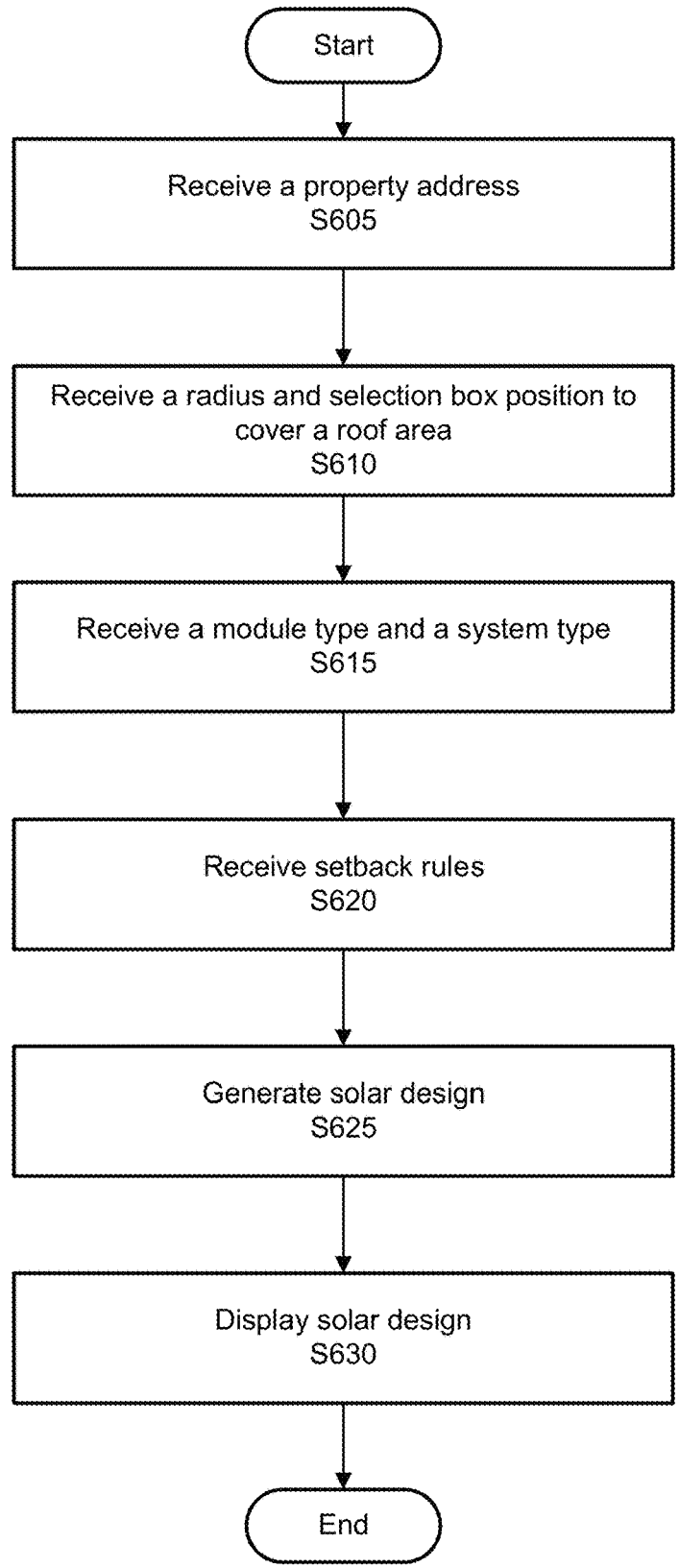
FIG. 6 is an algorithmic flow chart of a method for displaying a solar design on a user device according to one or more aspects of the disclosed subject matter.

FIG. 6 is an algorithmic flow chart of a method for displaying a solar design (e.g., the solar design 215) on a user device according to one or more aspects of the disclosed subject matter.

In S605, the server 105 can receive a property address as illustrated in FIG. 3A. For example, the property address can be a commercial address. The commercial address can be received from the remote device 110, for example. The commercial address can be entered via a user interface (e.g., the user interface 300) having a location input section (e.g., location input section 305).

In S610, the server 105 can receive a radius and selection box position to cover a roof area for the solar design as illustrated in FIG. 3A. The roof area covered by the selection box can be the entire roof or a portion of the roof. The radius can correspond to a dimension of the selection box to adjust the size of the selection box, and the selection box can be moved around the map view of the user interface to position the selection box. Accordingly, based on the received radius and selection box position, the server 105 can identify the roof for the solar design.

In S615, the server S615 can receive a module type and a system type as illustrated in FIG. 3B.

In S620, the server 105 can receive setback rules as illustrated in FIG. 3C. The setback rules can be based on one or more of obstructions identified on the roof and global and/or local rules and regulations. Regarding the setbacks based on the identified obstructions, rules can be set for the setbacks based on a size of the obstruction. Additionally, it should be appreciated that the information received by the server 105 can be received after the user selects the create design button 365. In other words, the server 105 can receive the information described in S605-S620 at the same time after the user selects the create design button 365.

In S625, the server 105 can generate a PV system design (i.e., solar design generation 210) based on the user input described in S605-S620. In other words, from a user perspective, the user can enter the user input, and the server 105 generates the solar design on the backend so the next thing the user sees after entering the address is the PV system design displayed to them (i.e., the solar design 215).

In S630, the server 105 can cause the solar design to be displayed. For example, the server 105 itself can display the solar design and/or the server 105 can transmit the solar design to the remote device 110 and the remote device 110 can display the solar design to the user. After the solar design is displayed, the process can end.

Figure 7:
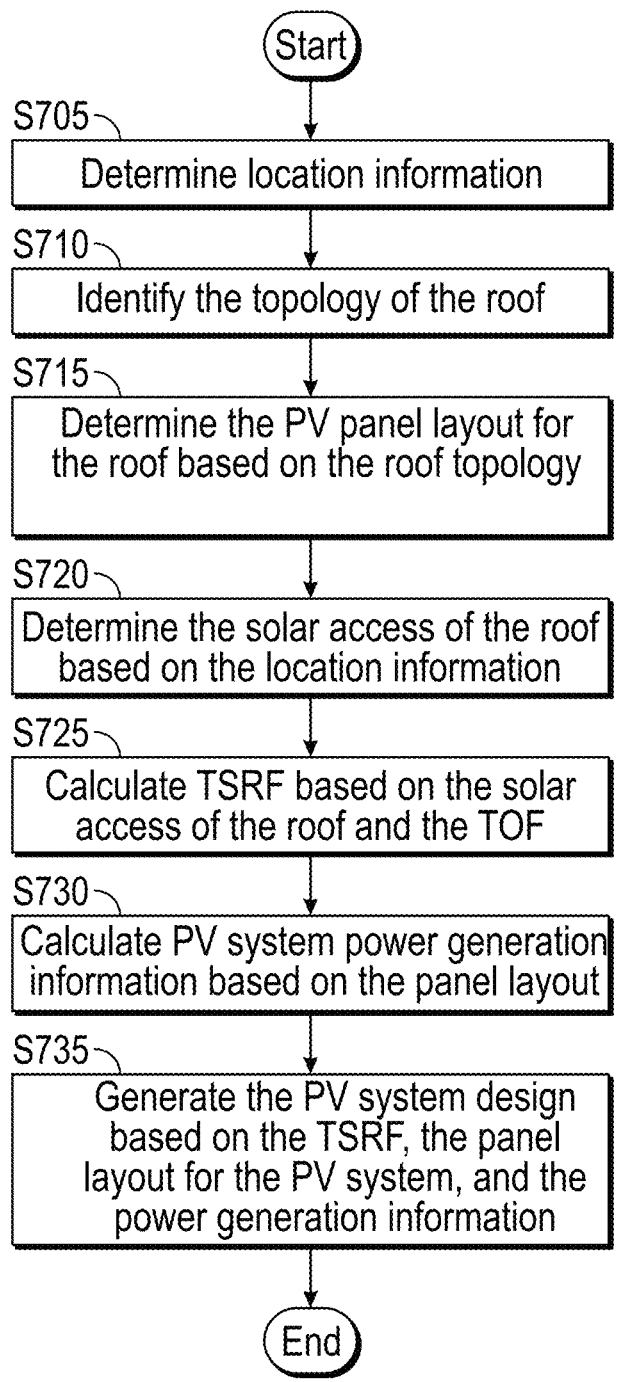
FIG. 7 is an algorithmic flowchart of a method for generating a PV system design according to one or more aspects of the disclosed subject matter.

FIG. 7 is an algorithmic flowchart of a method for generating a PV system design (e.g., solar design generation 210) according to one or more aspects of the disclosed subject matter.

In S705, the server 105 can determine location information. The location information can include a latitude and longitude of the location of the roof, identification of the nearest road (e.g., used for determining a front and back of the roof), satellite imagery of the roof, a digital surface model (DSM), RGB pixel information, red-blue-green-depth (RGBD) information (i.e., combine RGB and DSM), mask information, and the like.

In S710, the server 105 can identify the topology of the roof. Identifying the topology of the roof can include identifying the segments of the roof, identifying any obstructions on the roof, identifying edges and vertices of the roof, and the like to accurately map out the area of the roof where PV panels can be placed.

In S715, the server 105 can determine the PV panel layout for the roof based on the topology of the roof. For example, the topology of the roof can include obstructions on the roof and different segments of the roof that can affect the placement of the PV panels.

In S720, the server 105 can determine the solar access of the roof based on the location information. In one aspect, the user input described in S605-S620 and/or the layout information (e.g., layout 425) can also be used to determine the solar access of the roof in addition to the location information. The solar access of the roof can correspond to the percentage of sunlight the roof can receive over time (e.g., solar access information 330).

In S725, the server 105 can calculate a total solar radiation factor (TSRF) of the roof based on the solar access of the roof determined in S720 and a tilt orientation factor (TOF) of the roof. The TOF can be calculated using heliopath information calculated during the solar access calculation as further described herein.

In S730, the server 105 can calculate PV system power generation information based on the panel layout determined in S715.

In S735, the server 105 can generate the PV system design. For example, the generated PV system design can be generated based on the TSRF information (S725), the specific panel layout on the roof (S715), the solar access (S720), and the PV system power generation information (S730). After the PV system design is generated, the process can end.

Figure 8:
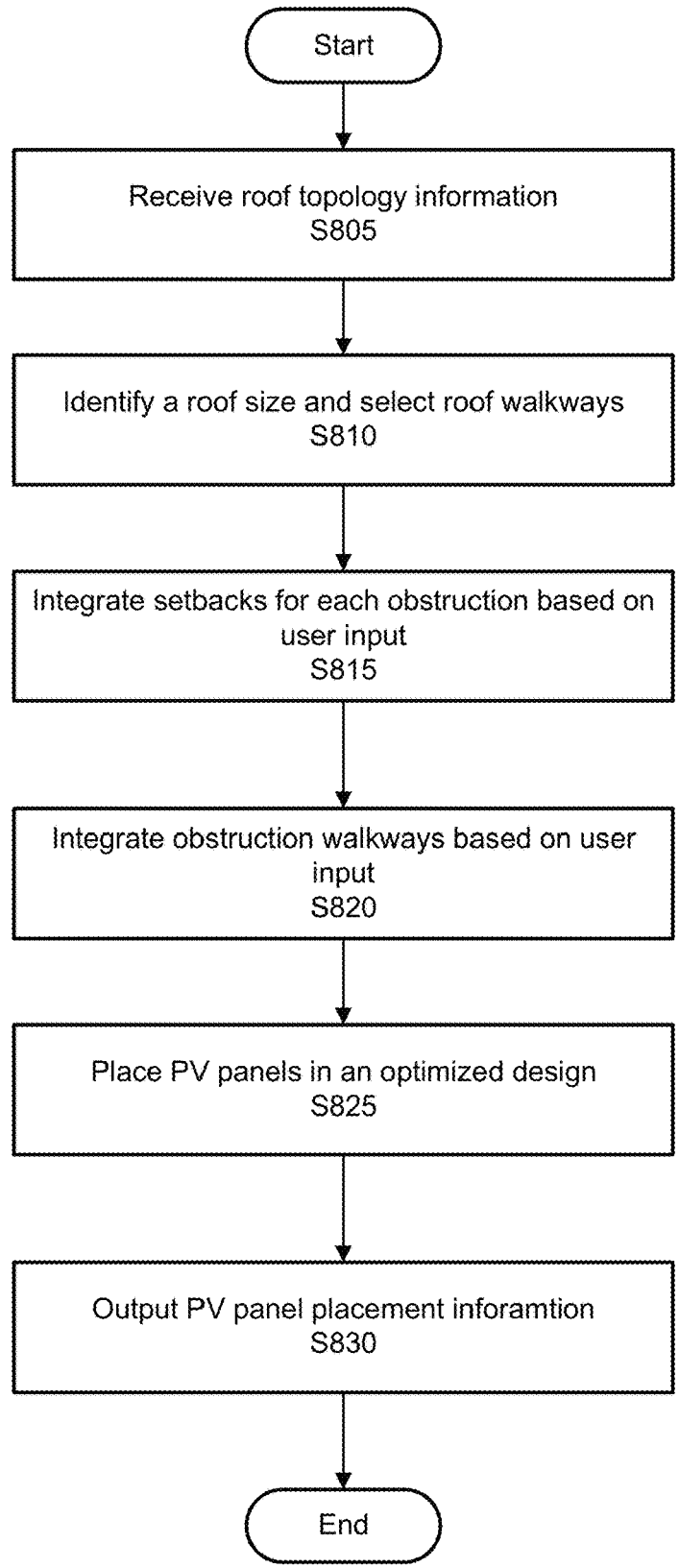
FIG. 8 is an algorithmic flow chart of a method for determining placement of PV panels in the solar design generation according to one or more aspects of the disclosed subject matter.

FIG. 8 is an algorithmic flow chart of a method for determining placement of PV panels (e.g., determining PV panel layout in S715) in the solar design generation 210 according to one or more aspects of the disclosed subject matter.

In S805, the server 105 can use the location information and the roof topology information determined in S710 to determine PV panel placement on the roof.

In S810, the server 105 can identify a roof size and select roof walkways. For example, based on the roof topology information, the server 105 can select walkways for the roof.

In S815, the server 105 can integrate setbacks into the roof for each obstruction based on the user input (e.g., FIG. 3C). Setbacks can be a portion of the roof where panels cannot be placed. Alternatively, or additionally, setbacks can be determined by law based on the jurisdiction the address is located in, for example. Additionally, as illustrated in FIG. 3C, setbacks can be integrated based on different sizes of the obstruction or a corresponding setback input by the user.

In S820, the server 105 can integrate walkways into the panel layout. For example, the panel placement can be optimized so that there are walkways on the roof to access the PV panels and maneuver around obstructions.

In S825, the system 105 can place the PV panels in an optimized design. For example, the PV panel placement can maximize the surface area where panels can be placed by accounting for roof topology (e.g., obstructions on the roof), walkways, and setbacks.

In S830, the server 105 can output the PV panel placement determined in S825. After the PV panel placement information is output, the process can end.

Figure 9:
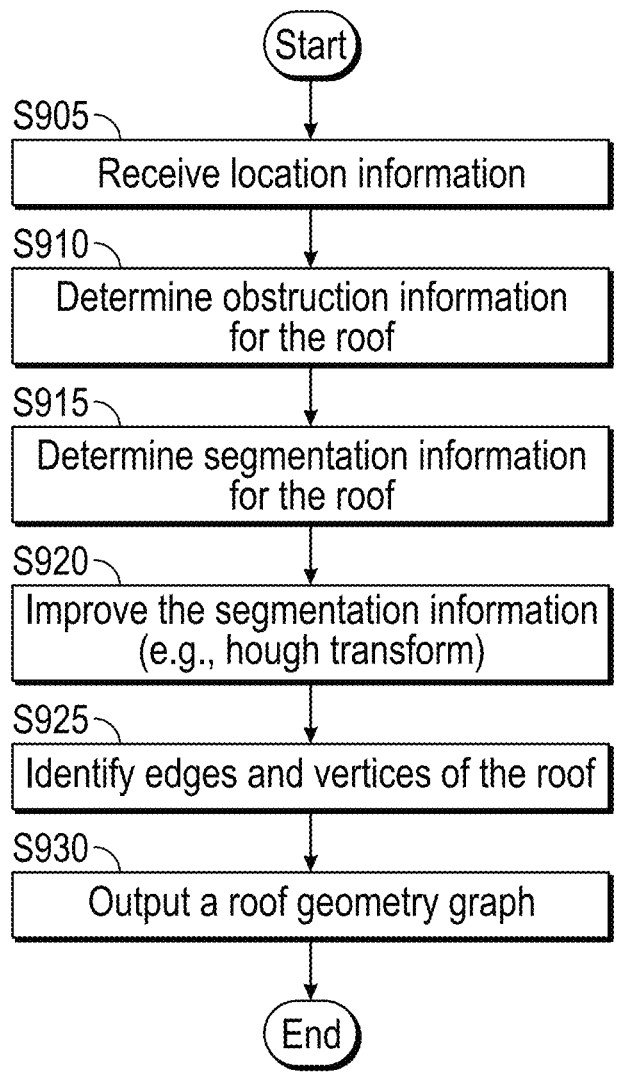
FIG. 9 is an algorithmic flow chart of a method for determining roof topology according to one or more aspects of the disclosed subject matter.

FIG. 9 is an algorithmic flow chart of a method for determining roof topology according to one or more aspects of the disclosed subject matter.

In S905, the location information determined in S705 can be used for identifying the roof topology.

Figure 10:
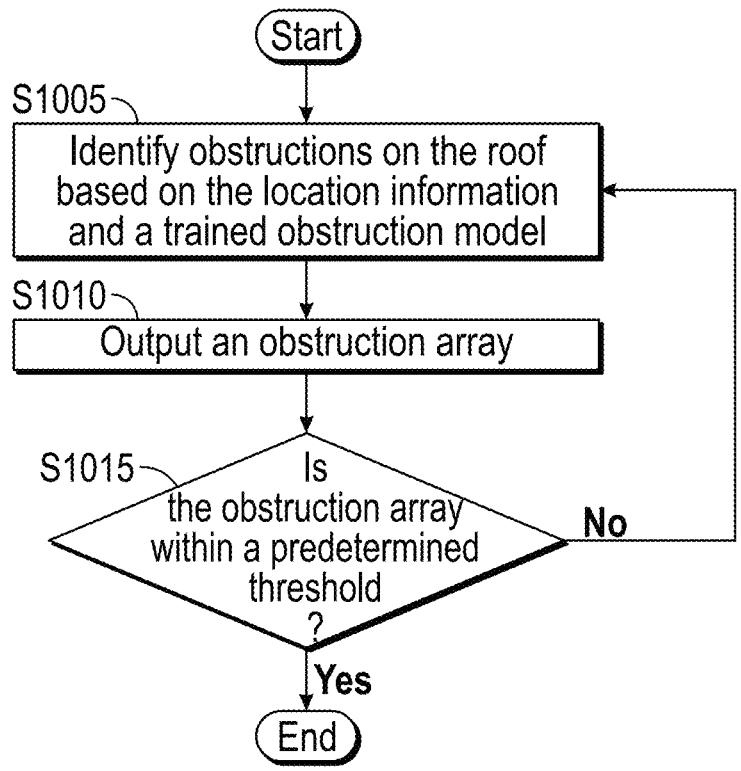
FIG. 10 is an algorithmic flow chart of a method for identifying obstructions on the roof according to one or more aspects of the disclosed subject matter.

In S910, the server 105 can determine obstruction information for the roof based on the location information and a trained machine learning model (see FIG. 10).

Figure 11:
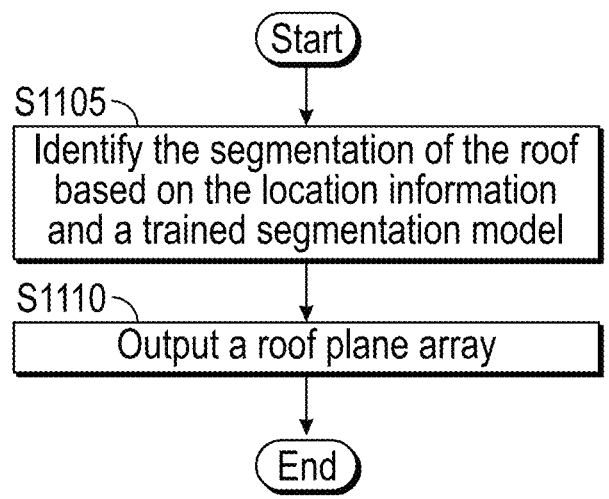
FIG. 11 is an algorithmic flow chart of a method for identifying segments of the roof according to one or more aspects of the disclosed subject matter.

In S915, the server 105 can determine segmentation information for the roof based on the location information and a trained machine learning model (see FIG. 11).

In S920, the segmentation information can be improved. For example, the segmentation information can become more accurate by applying a feature extraction technique (e.g., the Hough transform) to the segmentation information.

In S925, the server 105 can identify the edges and vertices of the roof based on the improved segmentation information.

In S930, the server 105 can output a roof geometry graph based on the identified edges and vertices in S925. A roof geometry graph is a graph that defines the segments of a roof. It includes the edges and vertices of a roof and equations representing the planes of the roof. For example, each roof segment has an equation which can be used to deduce tilt and azimuth of that segment. Additionally, the roof geometry graph can be used to deduce the adjacencies of the roof planes. After the roof geometry graph is output, the process can end.

FIG. 10 is an algorithmic flow chart of a method for identifying obstructions on the roof according to one or more aspects of the disclosed subject matter.

In S1005, the server 105 can identify obstructions on the roof based on the location information determined in S705 and an obstruction model trained using machine learning. For example, the machine learning algorithm can be fed a training set of annotated roofs with all the obstructions on the roof being labeled. The machine learning algorithm can then output an obstruction model that can be used to identify obstructions on the roof that corresponds to the property address input by the user.

In S1010, the server 105 can output an obstruction array based on the obstructions identified on the roof. The obstruction array is a collection of potential obstructions identified by the machine learning obstruction model. In other words, the obstruction array is a collection of polygons that define the obstruction in 3D and its location.

In S1015, it can be determined if the obstruction array is within a predetermined threshold. In other words, determining if the obstruction array is within a predetermined threshold is a check on the reasonableness of the obstruction array. If it is determined that the obstruction array is not within the predetermined threshold, the process can return to S1005 to identify obstructions on the roof until the obstruction array is within the predetermined threshold. However, if it is determined that the obstruction array is within the predetermined threshold, the process can end.

FIG. 11 is an algorithmic flow chart of a method for identifying segments of the roof according to one or more aspects of the disclosed subject matter.

In S1105, the server 105 can identify segments of the roof based on the location information determined in S705 and a segmentation model trained using machine learning. For example, the machine learning algorithm can be fed a training set of annotated roofs with all the roof planes of the roof being labeled. The machine learning algorithm can then output a segmentation model that can be used to identify segments of the roof that corresponds to the property address input by the user.

In S1110, the server 105 can output a segmentation array based on the segments of the roof identified in S1105. The segmentation array is a collection of potential segments of a roof identified by the machine learning segmentation model, and a segment in the segmentation array can correspond to a polygon defined by edges and vertices in 3D. After outputting the roof place array in S1110, the process can end.

Figure 12:
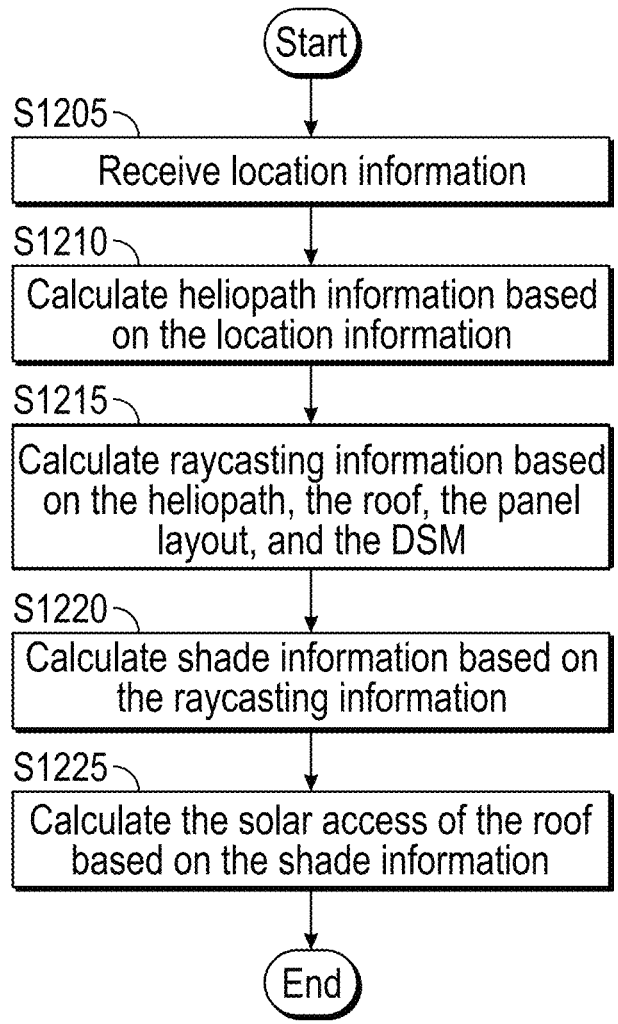
FIG. 12 is an algorithmic flow chart of a method for determining solar access of the roof according to one or more aspects of the disclosed subject matter.

FIG. 12 is an algorithmic flow chart of a method for determining solar access of the roof according to one or more aspects of the disclosed subject matter.

In S1205, the location information determined in S705 can be used for determining solar access of the roof.

In S1210, the server 105 can calculate heliopath information based on the location information. The heliopath information can correspond to the path of the sun through the sky throughout the year from the perspective of the location of the property address. The path of the sun can be calculated accurately for each second of the year.

In S1215, the server 105 can calculate raycasting information based on the heliopath information, the roof, the panel layout, and the DSM calculated as part of the location information. More specifically, the raycasting information can correspond to ray tracing the rays of the sun (i.e., based on the heliopath information) to determine if the rays will have access to the roof. The DSM can be used to determine if any structures near and/or on the roof will block and/or diffuse the rays of the sun. In other words, the raycasting information can be used to determine if any portion of the roof will be shaded and for how long (i.e., calculating shade information in S1220) based on the object blocking the sun rays and the path of the sun through the sky.

In S1220, the server 105 can calculate shade information based on the raycasting information calculated in S1215. For example, the shade information can include how much of the roof will be covered in shade and for how long.

In S1225, the server 105 can calculate the solar access of the roof based on the shade information. For example, the solar access can be the percentage of the solar availability of the roof over time (e.g., solar access 390). After the solar access is calculated, the process can end.

The system 100 can include several advantages. For example, the system 100 can generate a commercial design in less than a minute, which is significantly faster than the traditional method with can be a multi-hour process. For example, in the traditional and more manual process, incorporating all of the unique roof geometry with unique obstruction geometry, corresponding global and national fire and safety codes, and selecting the most optical commercial system type and module is a multi-hour process that often results in under-utilized and unoptimized solar systems. Because, traditionally, these different parameters were optimized by significant manual work and the experience of solar designers, the design process was suboptimal and inefficient. Accordingly, the system 100 and the corresponding functionality significantly improves the time it takes to generate a solar design (e.g., less than a minute). As a result, the system 100 can generate solar designs for many solar designs in one day that would have previously taken significantly longer (i.e., several days). For example, if a company that owns several commercial buildings wants to generate solar designs for their commercial buildings, the system 100 can generate each design in less than a minute rather than up to a day for each commercial building.

It should be appreciated that any two or more of the processes described in FIGS. 4-12 can run in parallel as directed by the system 100 and the server 105, for example.

In the above description of FIGS. 4-12, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 13:
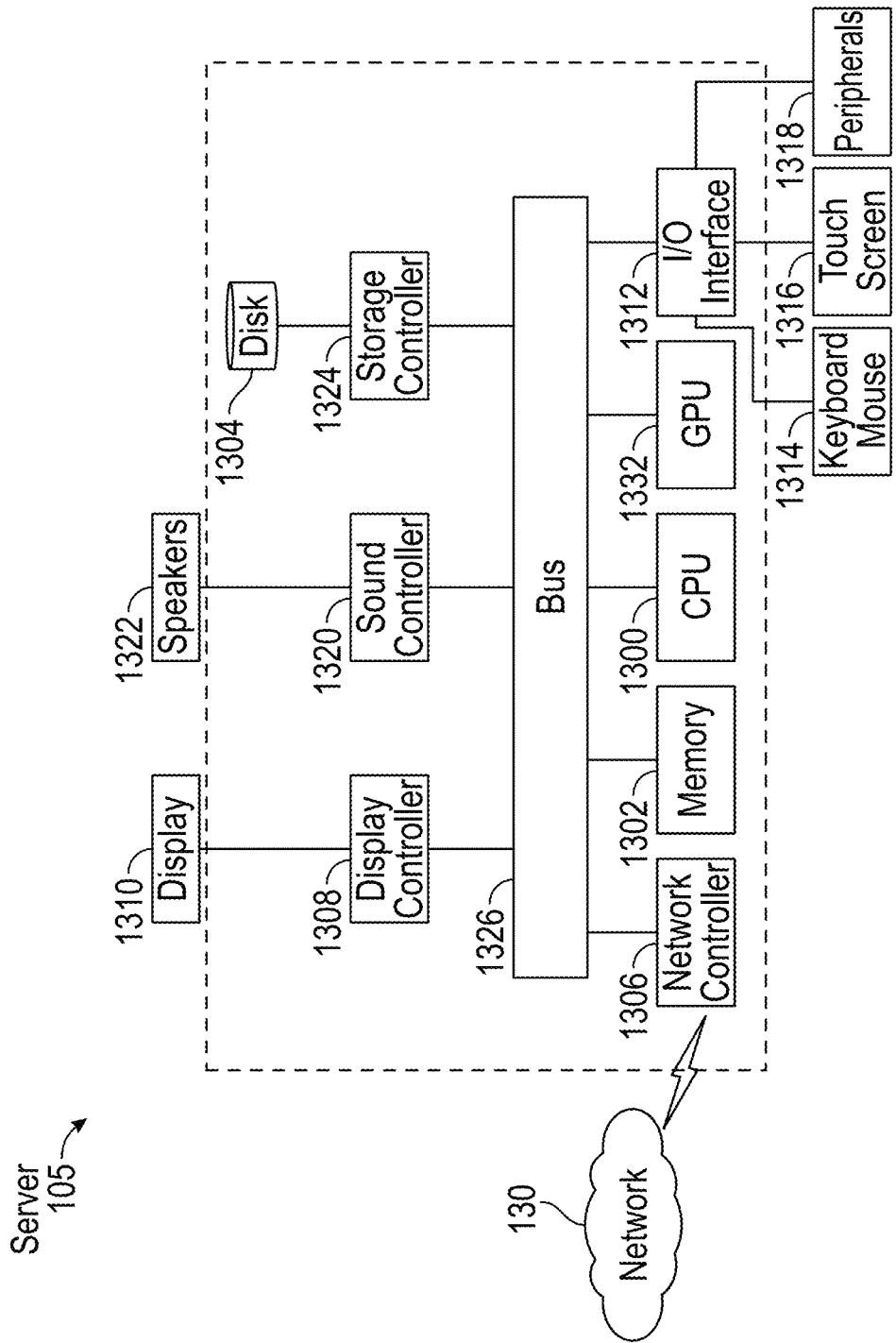
FIG. 13 is a hardware block diagram of a server according to one or more exemplary aspects of the disclosed subject matter.

Next, a hardware description of a server (such as the server 105) according to exemplary embodiments is described with reference to FIG. 13. The hardware description described herein can also be a hardware description of the processing circuitry. In FIG. 13, the server 105 includes a CPU 1300 which performs one or more of the processes described herein. Additionally, either individually or in combination with the CPU 1300, a GPU 1332 can perform one or more of the processes described herein. The process data and instructions may be stored in memory 1302. These processes and instructions may also be stored on a storage medium disk 1304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 105 communicates, such as a server or computer.

Further, the claimed advancements may be provided as a utility application, background daemon, or component of an operating system, or combination thereof, executing in conjunction with CPU 1300 and an operating system such as Microsoft Windows, UNIX, Solaris, LINUX, Apple MAC-OS and other systems known to those skilled in the art.

The hardware elements in order to achieve the server 105 may be realized by various circuitry elements. Further, each of the functions of the above described embodiments may be implemented by circuitry, which includes one or more processing circuits. A processing circuit includes a particularly programmed processor, for example, processor (CPU) 1300, as shown in FIG. 13. A processing circuit also includes devices such as an application specific integrated circuit (ASIC) and conventional circuit components arranged to perform the recited functions.

In FIG. 13, the server 105 includes a CPU 1300 which performs the processes described above. Additionally, the GPU 1332 can perform or assist in performing the processes described herein. The GPU 1332 can be specialized electronic circuit designed to rapidly manipulate and alter memory. The highly parallel structure of a GPU makes them efficient for algorithms that process large blocks of data in parallel. The GPU can be present on a video card, embedded on a motherboard, or embedded in a CPU, for example. The server 105 may be a general-purpose computer or a particular, special-purpose machine. In one embodiment, the server 105 becomes a particular, special-purpose machine when the processor 1300 is programmed to generate a solar design (and in particular, any of the processes discussed with reference to FIGS. 4-12).

Alternatively, or additionally, the CPU 1300 may be implemented on an FPGA, ASIC, PLD or using discrete logic circuits, as one of ordinary skill in the art would recognize. Further, CPU 1300 may be implemented as multiple processors cooperatively working in parallel to perform the instructions of the inventive processes described above.

The server 105 in FIG. 13 also includes a network controller 1306, such as an Intel Ethernet PRO network interface card from Intel Corporation of America, for interfacing with network 130. As can be appreciated, the network 130 can be a public network, such as the Internet, or a private network such as an LAN or WAN network, or any combination thereof and can also include PSTN or ISDN sub-networks. The network 130 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known.

The server 105 further includes a display controller 1308, such as a graphics card or graphics adaptor for interfacing with display 1310, such as a monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners.

A sound controller 1320 is also provided in the server 105 to interface with speakers/microphone 1322 thereby providing sounds and/or music.

The general-purpose storage controller 1324 connects the storage medium disk 1304 with communication bus 1326, which may be an ISA, EISA, VESA, PCI, or similar, for interconnecting all of the components of the server 105. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Further, in one embodiment, the server 105 can be implemented in a cloud-based computing system and/or represent the virtualized hardware in a serverless environment programmed to generate solar designs (and in particular, any of the processes of the system 100 discussed with reference to FIGS. 4-12). More specifically, the processing may be performed using a serverless architecture for scalability. For example, cloud computing aggregates physical and virtual computation, storage, and network resources in the "cloud." Serverless computing offers a high level of computational abstraction, with increased scalability. Serverless computing works by uploading code to a serverless computing environment (or serverless computing platform or serverless environment), and the serverless computing environment executes the code. Additionally, the serverless computing environment can be event driven, meaning that the code can execute or perform computations triggered by events. In some cases, the code can be executed on demand, or according to a predetermined schedule. In a serverless computing environment, the user is abstracted from the setup and execution of the code in the networked hardware resources in the cloud. In some cases, the serverless computing environments are virtualized computing environments having an application programming interface (API) which abstracts the user from the implementation and configuration of a service or application in the cloud.

Figure 14A:
Figure 14B:
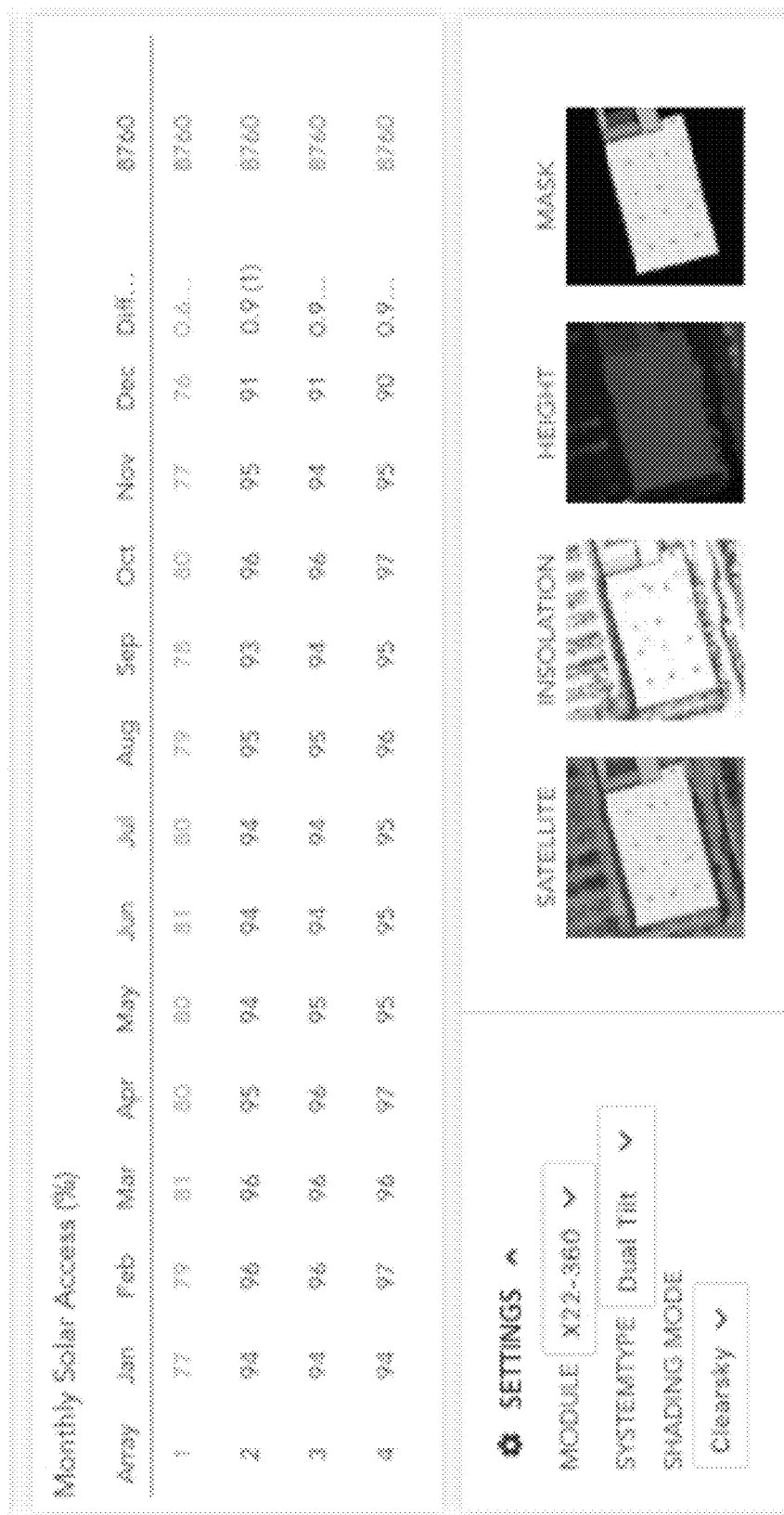
Figure 14C:
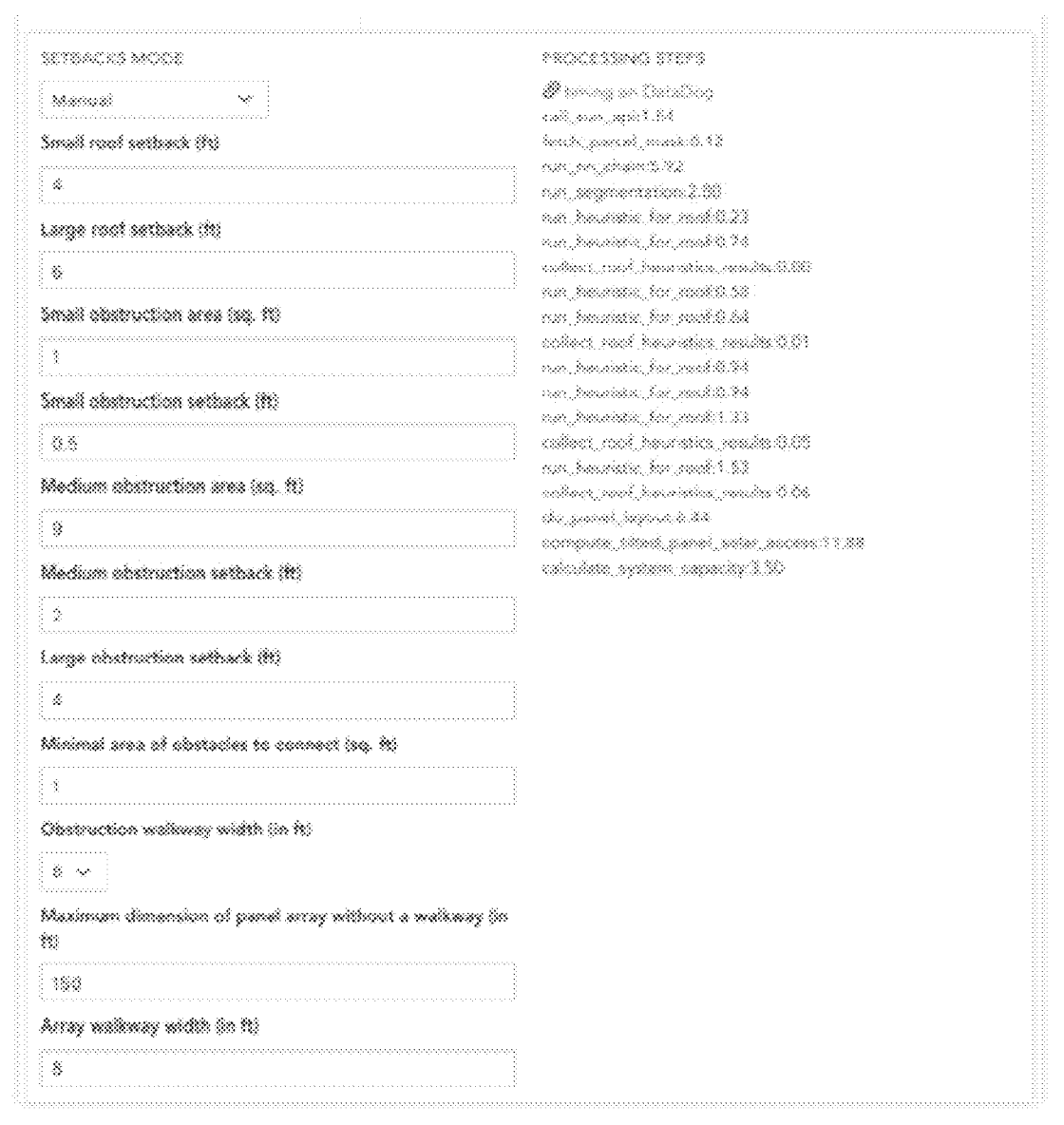

FIGS. 14A, 14B, and 14C illustrate an exemplary user interface 1400 according to one or more aspects of the disclosed subject matter. The user interface 1400 can be displayed via an electronic device (e.g., the mobile device 110). The user interface 1400 can be configured to receive user input and display the solar design and corresponding information. It should be appreciated that each of FIGS. 14A-14C include a portion of the entire user interface 1400. For example, the portions of the user interface 1400 illustrated in each of FIGS. 14A-14C can be connected so that a user either sees the entire user interface 1400 and/or can scroll to view the different portions of the user interface 1400 on their display.

Figure 15:
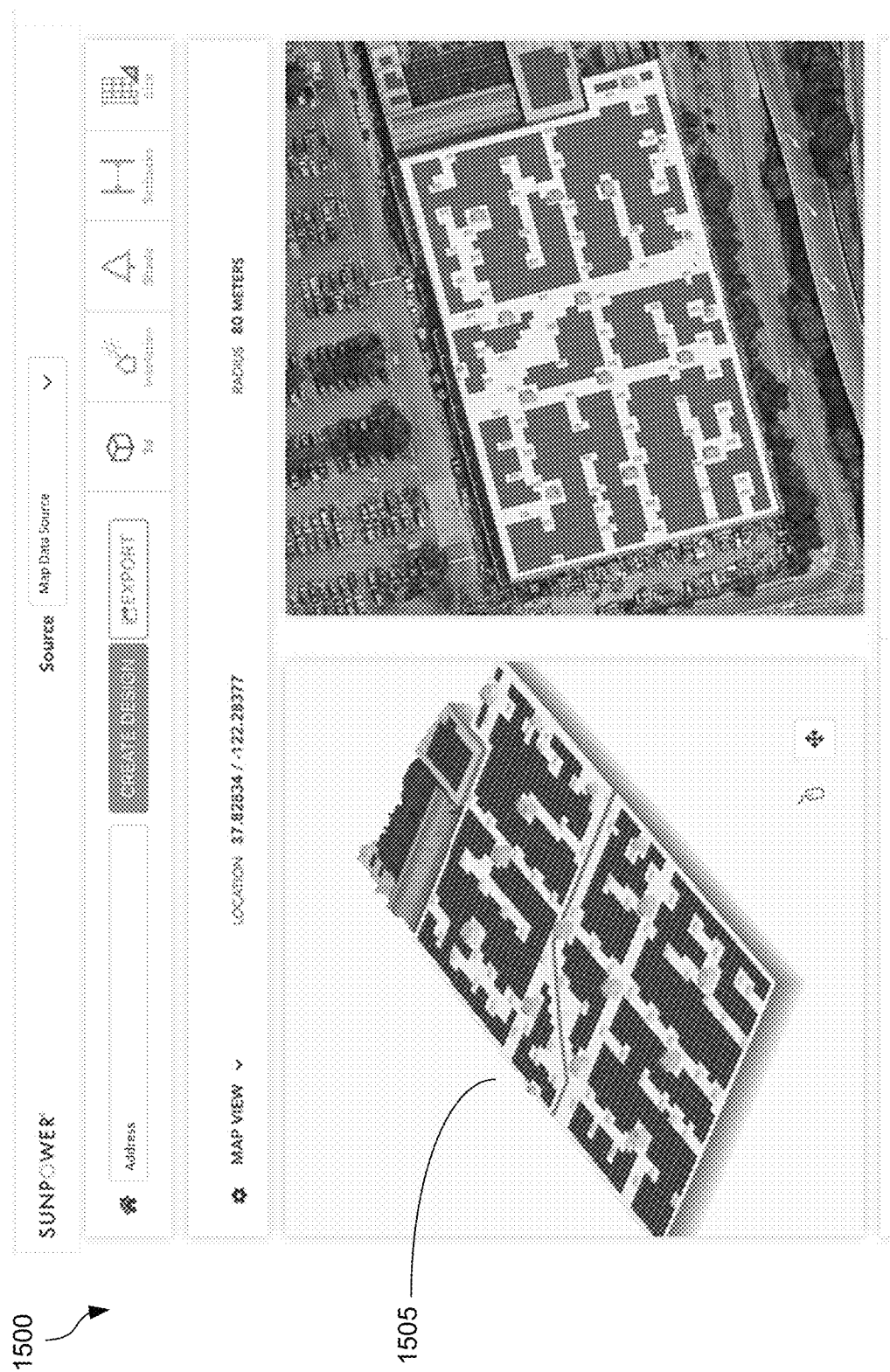
FIG. 15 illustrates an exemplary portion of a user interface according to one or more aspects of the disclosed subject matter.

FIG. 15 illustrates an exemplary portion of a user interface 1500 according to one or more aspects of the disclosed subject matter. For example, the user interface 1500 can include displaying a three-dimensional model 1505 of the solar design generated in response to receiving the user input. For example, the three-dimensional model 1505 can include the placement of the PV panels, the obstacles, the setbacks, the walkways, and the like in three-dimensions to get a better understanding of the layout. For example, it may be easier to identify if a size of a walkway is sufficient for a particular section of the design. Additionally, the three-dimensional model can be rotated to be viewed from different angles. In one aspect, the three-dimensional model 1505 can be included in the user interface 300 and/or 1400.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A method, comprising:
 receiving, by processing circuitry, information including an address corresponding to a building having a roof;
 in response to receiving the information, automatically generating, by a server, a solar design for the roof in real time based on the received information, wherein automatically generating the solar design includes,
  determining a roof topology by reconstructing a three-dimensional representation of the roof, wherein determining the roof topology includes
   receiving output from a trained segmentation machine learning model, wherein the trained segmentation machine learning model is configured to identify types of roof edges; and
   receiving output from a trained obstruction machine learning model, wherein the trained obstruction model is configured to identify obstructions on the roof;
  determining a photovoltaic panel layout based on the roof topology; and
  receiving setback rules, wherein receiving the setback rules includes
   receiving a maximum dimension of a photovoltaic (PV) panel array without a walkway; and
   receiving an array walkway width; and
 displaying, by the processing circuitry, the solar design, wherein the displayed solar design is interactive; and
 in response to receiving an update to the solar design by changing an aspect of the displayed solar design, automatically generating an updated solar design in real time based on the update.

2. The method of claim 1, further comprising:
 displaying an overhead view of the roof
 receiving a radius corresponding to a selection box, and
 receiving a selection box position, wherein the selection box position corresponds to the selection box covering at least a portion of the roof.

3. The method of claim 1, further comprising:
 receiving a photovoltaic module type; and
 receiving a system type for the photovoltaic module, wherein the system type corresponds to a single tilt or dual tilt design.

4. The method of claim 1, wherein receiving setback rules further comprises:
 receiving a small roof set back; and
 receiving a large roof set back.

5. The method of claim 1, wherein receiving setback rules further comprises:
 receiving a small obstruction area; and
 receiving a small obstruction setback, wherein the small obstruction setback is applied to any obstruction that has an area less than the small obstruction area.

6. The method of claim 5, wherein receiving setback rules further comprises:
 receiving a medium obstruction area;
 receiving a medium obstruction setback, wherein the medium obstruction setback is applied to any obstruction that has an area less than the medium obstruction area and greater than or equal to the small obstruction area; and
 receiving a large obstruction setback, wherein the large obstruction setback is applied to any obstruction that has an area greater than or equal to the medium obstruction area.

7. The method of claim 1, wherein receiving setback rules further comprises:
 receiving a minimum area of obstacles to connect, wherein the minimum area of obstacles to connect corresponds to which obstacles on the roof have walkway access as part of the solar design.

8. The method of claim 1, further comprising:
 determining location information;
 identifying a topology of a roof identified based on the location information;
 determining a photovoltaic (PV) panel layout for the roof based on the roof topology;
 determining a solar access of the roof based on the location information;
 calculating a total solar radiation factor (TSRF) based on the solar access of the roof and a tilt orientation factor (TOF);
 calculating power generation information for the solar design based on the panel layout; and
 generating the solar design based on the TSRF, the panel layout, and the power generation information.

9. The method of claim 8, wherein determining the PV panel layout further comprises:

receiving roof topology information;
identifying a roof size and selecting roof walkways;
integrating setbacks for each obstruction based on the received information;
integrating obstruction walkways based on the received information;
placing the PV panels based on the integrated setbacks, obstruction walkways, and roof walkways; and
outputting PV panel placement information.

10. The method of claim 8, wherein identifying the roof topology further comprises:
determining obstruction information for the roof;
determining segmentation information for the roof;
improving the segmentation information via feature extraction;
identifying edges and vertices of the roof; and
outputting a roof geometry graph.

11. The method of claim 10, wherein determining obstruction information further comprises:
identifying obstructions on the roof based on the location information and a trained obstruction model;
outputting an obstruction array; and
determining whether the obstruction array is within a predetermined threshold.

12. The method of claim 10, wherein determining segmentation information further comprises:
identifying a segmentation of the roof based on the location information and a trained segmentation model; and
outputting a roof plane array.

13. The method of claim 8, wherein determining solar access of the roof further comprises:
calculating heliopath information based on the location information;
calculating raycasting information based on the heliopath information, a roof layout, a panel layout, and a digital surface model (DSM);
calculating shade information based on the raycasting information; and
calculating the solar access of the roof based on the shade information.

14. The method of claim 1, wherein the received information for automatically generating the solar design in real time further includes a selected area including at least a portion the roof, a system type, a module type, setback rules, and walkway rules.

15. A method, comprising:
receiving, by processing circuitry, information including an address corresponding to a building having a roof;
in response to receiving the information, automatically generating, by a server, a solar design for the roof in real time based on the received information, wherein automatically generating the solar design includes,
determining a roof topology by reconstructing a three-dimensional representation of the roof, wherein determining the roof topology includes
receiving output from a trained segmentation machine learning model, wherein the trained segmentation machine learning model is configured to identify types of roof edges; and
receiving output from a trained obstruction machine learning model, wherein the trained obstruction model is configured to identify obstructions on the roof;
determining a photovoltaic panel layout based on the roof topology; and
receiving setback rules, wherein receiving the setback rules includes
receiving a small obstruction area; and
receiving a small obstruction setback, wherein the small obstruction setback is applied to any obstruction that has an area less than the small obstruction area; and
displaying, by the processing circuitry, the solar design, wherein the displayed solar design is interactive; and
in response to receiving an update to the solar design by changing an aspect of the displayed solar design, automatically generating an updated solar design in real time based on the update.

16. The method of claim 15, wherein receiving setback rules further comprises:
receiving a medium obstruction area;
receiving a medium obstruction setback, wherein the medium obstruction setback is applied to any obstruction that has an area less than the medium obstruction area and greater than or equal to the small obstruction area; and
receiving a large obstruction setback, wherein the large obstruction setback is applied to any obstruction that has an area greater than or equal to the medium obstruction area.

17. A method, comprising:
receiving, by processing circuitry, information including an address corresponding to a building having a roof;
in response to receiving the information, automatically generating, by a server, a solar design for the roof in real time based on the received information, wherein automatically generating the solar design includes,
determining a roof topology by reconstructing a three-dimensional representation of the roof, wherein determining the roof topology includes
receiving output from a trained segmentation machine learning model, wherein the trained segmentation machine learning model is configured to identify types of roof edges; and
receiving output from a trained obstruction machine learning model, wherein the trained obstruction model is configured to identify obstructions on the roof;
determining a photovoltaic panel layout based on the roof topology; and
receiving setback rules, wherein receiving the setback rules includes
receiving a minimum area of obstacles to connect, wherein the minimum area of obstacles to connect corresponds to which obstacles on the roof have walkway access as part of the solar design; and
displaying, by the processing circuitry, the solar design, wherein the displayed solar design is interactive; and
in response to receiving an update to the solar design by changing an aspect of the displayed solar design, automatically generating an updated solar design in real time based on the update.

18. A method, comprising:
receiving, by processing circuitry, information including an address corresponding to a building having a roof;
in response to receiving the information, automatically generating, by a server, a solar design for the roof in real time based on the received information, wherein automatically generating the solar design includes,
determining a roof topology by reconstructing a three-dimensional representation of the roof, wherein determining the roof topology includes receiving output from a trained segmentation machine learning model, wherein the trained segmentation machine learning model is configured to identify types of roof edges; and receiving output from a trained obstruction machine learning model, wherein the trained obstruction model is configured to identify obstructions on the roof;

determining a photovoltaic panel layout based on the roof topology, wherein determining the photovoltaic panel layout includes receiving roof topology information;

identifying a roof size and selecting roof walkways;

integrating setbacks for each obstruction based on the received information;

integrating obstruction walkways based on the received information;

placing the PV panels based on the integrated setbacks, obstruction walkways, and roof walkways; and outputting PV panel placement information; and displaying, by the processing circuitry, the solar design, wherein the displayed solar design is interactive; and in response to receiving an update to the solar design by changing an aspect of the displayed solar design, automatically generating an updated solar design in real time based on the update.

* * * * *